(12) United States Patent
Kim et al.

(10) Patent No.: US 10,397,463 B2
(45) Date of Patent: Aug. 27, 2019

(54) IMAGING DEVICE ELECTRONIC DEVICE, AND METHOD FOR OBTAINING IMAGE BY THE SAME

(71) Applicant: Samsung Electronics Co., Ltd., Gyeonggi-do (KR)

(72) Inventors: Moon-Soo Kim, Seoul (KR); Young-Kwon Yoon, Seoul (KR); Hwa-Young Kang, Gyeonggi-do (KR); Dong-Soo Kim, Gyeonggi-do (KR); Sung-Eun Kim, Gyeonggi-do (KR); Jong-Hun Won, Gyeonggi-do (KR); Hae-Sun Lee, Gyeonggi-do (KR); Taek-Seong Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 101 days.

(21) Appl. No.: 15/391,110

(22) Filed: Dec. 27, 2016

(65) Prior Publication Data

US 2017/0187949 A1   Jun. 29, 2017

(30) Foreign Application Priority Data

Dec. 24, 2015   (KR) .................. 10-2015-0186317

(51) Int. Cl.
*H04N 5/232*   (2006.01)
*H04N 5/225*   (2006.01)
(Continued)

(52) U.S. Cl.
CPC ....... *H04N 5/23212* (2013.01); *H04N 5/2258* (2013.01); *H04N 5/2355* (2013.01);
(Continued)

(58) Field of Classification Search
CPC ............ H04N 5/23212; H04N 5/3696; H04N 5/2258; H04N 5/35572; H04N 5/2355; H04N 9/09; H04N 2209/048
See application file for complete search history.

(56) References Cited

U.S. PATENT DOCUMENTS

2007/0024738 A1 * 2/2007 Kanai ...................... G02B 7/34
348/335
2008/0219654 A1 * 9/2008 Border ............... H04N 5/23212
396/89
(Continued)

FOREIGN PATENT DOCUMENTS

| JP | 2011-077829 | 4/2011 |
| KR | 10-1373132 | 3/2014 |
| WO | WO 2015/190156 | 12/2015 |

OTHER PUBLICATIONS

International Search Report dated Feb. 16, 2017 issued in counterpart application No. PCT/KR2016/013264, 10 pages.
(Continued)

*Primary Examiner* — Lin Ye
*Assistant Examiner* — John H Morehead, III
(74) *Attorney, Agent, or Firm* — The Farrell Law Firm, P.C.

(57) ABSTRACT

Methods and apparatuses are provided for obtaining an image by an electronic device. A first image for an object is obtained from a first image sensor of the electronic device. Information regarding a focusing state is determined with respect to the object based on the first image. The second image sensor of the electronic device is focused on the object based on the information regarding the focusing state. A second image for the object is obtained through the second image sensor.

18 Claims, 13 Drawing Sheets

(51) Int. Cl.
  *H04N 5/235* (2006.01)
  *H04N 5/355* (2011.01)
  *H04N 9/09* (2006.01)
  *H04N 5/369* (2011.01)

(52) U.S. Cl.
  CPC ....... *H04N 5/35572* (2013.01); *H04N 5/3696* (2013.01); *H04N 9/09* (2013.01); *H04N 2209/048* (2013.01)

(56) References Cited

U.S. PATENT DOCUMENTS

| | | | | |
|---|---|---|---|---|
| 2009/0109321 | A1* | 4/2009 | Takeuchi | G03B 13/36 348/345 |
| 2009/0135292 | A1* | 5/2009 | Muramatsu | G03B 13/18 348/349 |
| 2009/0284645 | A1* | 11/2009 | Nozaki | G02B 7/36 348/349 |
| 2011/0076001 | A1 | 3/2011 | Iwasaki | |
| 2012/0044406 | A1* | 2/2012 | Shimoda | G02B 7/365 348/345 |
| 2012/0147150 | A1* | 6/2012 | Kojima | G01C 3/085 348/50 |
| 2012/0212662 | A1* | 8/2012 | Shimoda | H04N 5/23212 348/349 |
| 2012/0224096 | A1* | 9/2012 | Shimoda | G02B 7/36 348/349 |
| 2013/0016251 | A1* | 1/2013 | Ogasahara | H04N 5/2258 348/238 |
| 2014/0139645 | A1* | 5/2014 | Ono | H04N 5/2254 348/49 |
| 2014/0176785 | A1* | 6/2014 | Sambonsugi | H04N 5/23212 348/350 |
| 2014/0334683 | A1 | 11/2014 | Masuda | |
| 2014/0347532 | A1* | 11/2014 | Kang | H04N 5/351 348/294 |
| 2015/0062390 | A1 | 3/2015 | Kim et al. | |
| 2015/0116534 | A1* | 4/2015 | Kim | H04N 1/6027 348/223.1 |
| 2015/0163434 | A1* | 6/2015 | Ishibashi | G02B 7/34 348/66 |
| 2015/0195467 | A1 | 7/2015 | Shim et al. | |
| 2015/0296194 | A1 | 10/2015 | Cho et al. | |
| 2015/0312557 | A1* | 10/2015 | Kim | H04N 5/3535 348/46 |
| 2016/0301847 | A1 | 10/2016 | Okazawa | |
| 2018/0091755 | A1* | 3/2018 | Kim | H04N 5/3535 |

OTHER PUBLICATIONS

European Search Report dated May 11, 2017 issued in counterpart application No. 16204774.0-1902, 8 pages.

* cited by examiner

IMAGING DEVICE ELECTRONIC DEVICE, AND METHOD FOR OBTAINING IMAGE BY THE SAME

PRIORITY

This application claims priority under 35 U.S.C. § 119(a) to Korean Patent Application No. 10-2015-0186317, filed in the Korean Intellectual Property Office on Dec. 24, 2015, the entire disclosure of which is incorporated herein by reference.

BACKGROUND

1. Field of the Invention

The present disclosure relates generally to electronic devices for obtaining images of objects and methods for obtaining images by the same, and more particularly, to electronic devices and methods for obtaining higher-quality images by synthesizing a mono-color image with a color image.

2. Description of the Related Art

The term "electronic device" may refer to a device performing a particular function according to its equipped program, such as, for example, a home appliance, an electronic scheduler, a portable multimedia player, a mobile communication terminal, a tablet personal computer (PC), a video/sound device, a desktop PC or laptop computer, a navigation for automobile, etc. Electronic devices may output stored information as voices or images. Since electronic devices are highly integrated and high-speed, a large volume of wireless communication has become commonplace, and mobile communication terminals have been equipped with various functions. For example, one electronic device may be equipped with communication functions, entertainment functions, multimedia functions, various security functions, or an electronic wallet.

Examples of imaging devices and/or electronic devices that are capable of capturing an image include digital cameras. As electric/electronic technology develops, other types of electronic devices (e.g., mobile communication terminals) may also include image sensors for obtaining images of objects. The quality of an image that is obtained may vary depending on, for example, the performance of the image sensor or the quality of a lens assembly combined with the image sensor.

SUMMARY

The present disclosure has been made to address at least the above problems and/or disadvantages and to provide at least the advantages described below. Accordingly, an aspect of the present disclosure includes imaging device, an electronic device, and a method for obtaining an image by the same, which may obtain higher-quality images by synthesizing a mono-color image with a color image that includes color information on at least one of red light, green light, and blue light.

According to an aspect of the present disclosure, an imaging device is provided that includes a first image sensor having a plurality of first micro lenses and a plurality of first light receiving sensors. Each of the plurality of first light receiving sensors is configured to detect light passing through a corresponding one of the plurality of first micro lenses and convert the light into an electrical signal. The imaging device also includes a second image sensor having a plurality of second micro lenses, a plurality of second light receiving sensors, and color filters provided between one or more micro lenses of the plurality of second micro lenses and one or more light receiving sensors of the plurality of second light receiving sensors. Each of the plurality of second light receiving sensors is configured to detect light passing through a corresponding one of the plurality of second micro lenses and convert the light into an electrical signal. At least some of the plurality of the first light receiving sensors or at least some of the plurality of second light receiving sensors are set to be phase difference pixels that detect phase difference information for an object.

According to an aspect of the present disclosure, an electronic device is provided that includes a first image sensor, a second image sensor, and a processor. The processor is configured to obtain a first image for an object through the first image sensor, determine information regarding a focusing state with respect to the object based on the first image, focus the second image sensor on the object based on the information regarding the focusing state, and obtain a color image for the object through the second image sensor.

According to an aspect of the present disclosure, a method is provided for obtaining an image by an electronic device. A first image for an object is obtained from a first image sensor of the electronic device. Information regarding a focusing state is determined with respect to the object based on the first image. The second image sensor of the electronic device is focused on the object based on the information regarding the focusing state. A second image for the object is obtained through the second image sensor.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
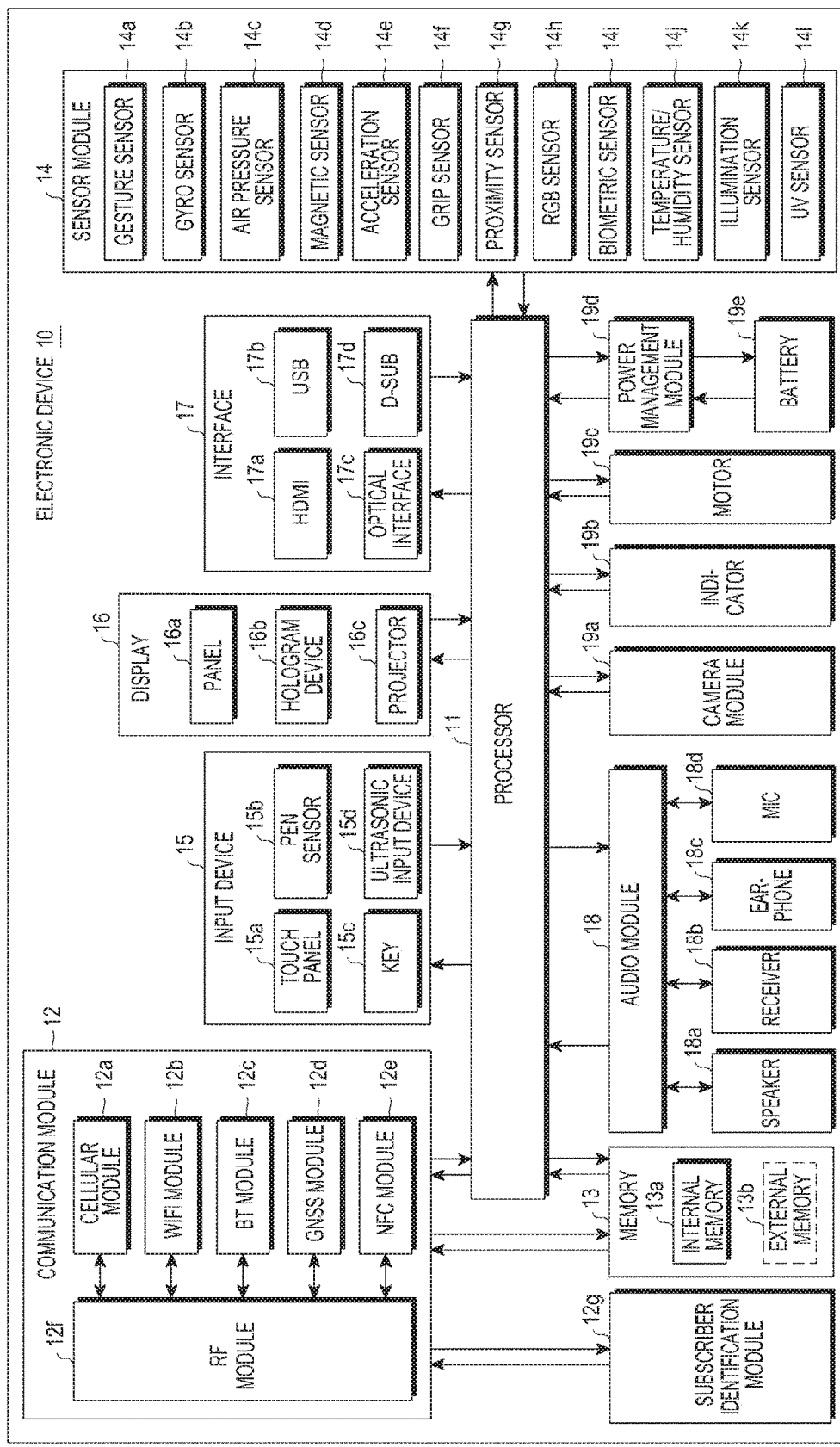
FIG. 1 is a block diagram illustrating an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions and processes known in the art may be omitted to avoid obscuring the subject matter of the present disclosure.

As used herein, the terms "A or B," "at least one of A and B," and "one or more of A and B" may include all possible combinations of A and B. For example, these terms may indicate at least one A, at least one B, and at least one A and at least one B.

As used herein, the terms "first" and "second" may modify various components regardless of importance and/or order and are used to distinguish a component from another without limiting the components. For example, a first user device and a second user device may indicate different user devices regardless of the order or importance of the devices. Additionally, a first component may be referred to as a second component, and vice versa, without departing from the scope of the present disclosure.

It will be understood that when an element (e.g., a first element) is referred to as being operatively or communicatively "coupled with/to," or "connected with/to" another element (e.g., a second element), it can be directly coupled or connected with/to the other element or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the phrase "configured (or set) to" may be interchangeably used with the phrases "suitable for," "having the capacity to," "designed to," "adapted to," "made to," or "capable of". The phrase "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or an application processor) that may perform the operations by executing one or more software programs stored in a memory device or a dedicated processor (e.g., an embedded processor) for performing the operations.

The terms used herein are provided to describe some embodiments thereof, but not to limit the present disclosure. It is to be understood that the singular forms "a," "an," and "the" include plural references unless the context clearly dictates otherwise. It will be further understood that the terms "comprise" and/or "have," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms used herein, have the same meanings as those commonly understood by one of ordinary skill in the art to which the embodiments of the present disclosure belong. It will be further understood that terms, such as those defined in commonly used dictionaries, should be interpreted as having meanings that are consistent with their meanings in the context of the relevant art and will not be interpreted in an idealized or overly formal sense unless expressly so defined herein. In some cases, terms defined herein may not be interpreted to exclude embodiments of the present disclosure.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be embodied as a smartphone, a mobile phone, a navigation device, a game device, a television (TV), a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the present disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

FIG. 1 is a block diagram illustrating an electronic device, according to an embodiment of the present disclosure.

Referring to FIG. 1, an electronic device 10 may include the whole or part of the configuration described below. The electronic device 10 includes one or more processors (e.g., application processors (APs)) 11, a communication module 12, a subscriber identification module (SIM) 12g, a memory 13, a sensor module 14, an input device 15, a display 16, an interface 17, an audio module 18, a camera module 19a, a power management module 19d, a battery 19e, an indicator 19b, and a motor 19c.

The processor 11 may control multiple hardware and software components connected to the processor 11 by running, for example, an operating system or application programs, and the processor 210 may process and compute various data. The processor 11 may be implemented in, for example, a system on chip (SoC). According to an embodiment of the present disclosure, the processor 11 may further include a graphic processing unit (GPU) and/or an image signal processor. The processor 11 may include at least some of the components shown in FIG. 1 (e.g., a cellular module 12a). The processor 11 may load a command or data received from at least one of other components (e.g., a non-volatile memory) on a volatile memory, process the command or data, and store various data in the non-volatile memory.

The communication module 12 includes, for example, the cellular module 12a, a Wi-Fi module 12b, a Bluetooth module 12c, a global navigation satellite system (GNSS) module 12d (e.g., a global positioning system (GPS) module, a Glonass module, a Beidou module, or a Galileo module), a near field communication (NFC) module 12e, and a radio frequency (RF) module 12f.

The cellular module 12a may provide voice call, video call, text, or Internet services through, for example, a communication network. According to an embodiment, the cellular module 12a may perform identification or authentication on the electronic device 10 in the communication network using the SIM 12g (e.g., a SIM card). The cellular module 12a may perform at least some of the functions providable by the processor 11. The cellular module 12a may include a communication processor (CP).

The Wi-Fi module 12b, the Bluetooth module 12c, the GNSS module 12d, or the NFC module 12e may include a process for, for example, processing data communicated through the module. At least some (e.g., two or more) of the cellular module 12a, the Wi-Fi module 12b, the Bluetooth module 12c, the GNSS module 12d, or the NFC module 12e may be included in a single integrated circuit (IC) or an IC package.

The RF module 12f may communicate data, such as, for example, communication signals (e.g., RF signals). The RF module 12f may include, for example, a transceiver, a power amp module (PAM), a frequency filter, a low noise amplifier (LNA), or an antenna. According to an embodiment of the present disclosure, at least one of the cellular module 12a, the Wi-Fi module 12b, the Bluetooth module 12c, the GNSS module 12d, and the NFC module 12e may communicate RF signals through a separate RF module.

The subscription identification module 12g may include, for example, a card including a SIM and/or an embedded SIM, and may contain unique identification information (e.g., an integrated circuit card identifier (ICCID) or subscriber information (e.g., an international mobile subscriber identity (IMSI)).

The memory 13 includes, for example, at least one of an internal memory 13a and an external memory 13b. The internal memory 13a may include at least one of, e.g., a volatile memory (e.g., a dynamic random access memory (RAM) (DRAM), a static RAM (SRAM), a synchronous dynamic RAM (SDRAM), etc.) or a non-volatile memory (e.g., a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 13b may include a flash drive, such as, for example, a compact flash (CF) memory, a secure digital (SD) memory, a micro-SD memory, a min-SD memory, an extreme digital (xD) memory, a multi-media card (MMC), or a removable flash memory. The external memory 13b may be functionally and/or physically connected with the electronic device 10 via various interfaces.

For example, the sensor module 14 may measure a physical quantity or detect an operation state of the electronic device 10, and the sensor module 14 may convert the measured or detected information into an electrical signal. The sensor module 14 includes, for example, at least one of a gesture sensor 14a, a gyro sensor 14b, an atmospheric pressure sensor 14c, a magnetic sensor 14d, an acceleration sensor 14e, a grip sensor 14f, a proximity sensor 14g, a color sensor 14h (e.g., a red-green-blue (RGB) sensor, a bio sensor 14i, a temperature/humidity sensor 14j, an illumination sensor 14k, and an ultra violet (UV) sensor 141. Additionally or alternatively, the sensing module 14 may include, for example, an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 14 may further include a control circuit for controlling at least one or more of the sensors included in the sensing module. According to an embodiment of the present disclosure, the electronic device 10 may further include a processor configured to control the sensor module 14 as part of the processor 11 or separately from the processor 11, and the electronic device 10 may control the sensor module 14 while the processor 11 is in a sleep mode.

The input unit 15 includes, for example, at least one of a touch panel 15a, a (digital) pen sensor 15b, a key 15c, and an ultrasonic input device 15d. The touch panel 15a may use at least one of capacitive, resistive, infrared, and ultrasonic methods. The touch panel 15a may further include a control circuit. The touch panel 15a may further include a tactile layer and may provide a user with a tactile reaction.

The (digital) pen sensor 15b may include a part of a touch panel or a separate sheet for recognition. The key 15c may include a physical button, an optical key, or a key pad. The ultrasonic input device 15d may sense an ultrasonic wave generated from an input tool through a microphone 18d to identify data corresponding to the sensed ultrasonic wave.

The display 16 includes at least one of a panel 16a, a hologram device 16b, and a projector 16c. The panel 16a may be implemented to be flexible, transparent, or wearable. The panel 16a, together with the touch panel 15a, may be configured in a single module. The hologram device 16b may make three dimensional (3D) images (holograms) in the air by using light interference. The projector 16c may display an image by projecting light onto a screen. The screen may be, for example, located inside or outside of the electronic device 10. In accordance with an embodiment, the display 16 may further include a control circuit to control the panel 16a, the hologram device 16b, or the projector 16c.

The interface 17 includes, for example, at least one of a high-definition multimedia interface (HDMI) 17a, a universal serial bus (USB) 17b, an optical interface 17c, and a D-subminiature (D-sub) 17d. Additionally or alternatively, the interface 17 may include a mobile high-definition link (MHL) interface, a secure digital (SD) card/multimedia card (MMC) interface, or an infrared data association (IrDA) standard interface.

The audio module 18 may convert a sound into an electric signal or vice versa, for example. The audio module 18 may process sound information input or output through e.g., a speaker 18a, a receiver 18b, an earphone 18c, or the microphone 18d.

For example, the camera module 19a may be capable of recording still images and videos, and may include, according to an embodiment of the present disclosure, one or more image sensors (e.g., front and back sensors), a lens, an image signal processor (ISP), or a flash such as an LED or xenon lamp.

The power manager module 19d may manage power of the electronic device 10, for example. According to an embodiment of the present disclosure, the power manager module 19d may include a power management integrated circuit (PMIC), a charger IC, or a battery gauge. The PMIC may have a wired and/or wireless recharging scheme. The wireless charging scheme may include, for example, a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 19e, a voltage, a current, or a temperature while the battery 19e is being charged. The battery 19e may include, for example, a rechargeable battery or a solar battery.

The indicator 19b may indicate a particular state of the electronic device 10 or a part of the electronic device (e.g., the processor 11), including, for example, a booting state, a message state, or a recharging state. The motor 19c may convert an electric signal into a mechanical vibration and may generate a vibrational or haptic effect. A processing unit for supporting mobile TV, such as a GPU may be included in the electronic device 10. The processing unit for supporting mobile TV may process media data conforming to a standard for digital multimedia broadcasting (DMB) or digital video broadcasting (DVB), or mediaFlo™.

Each of the aforementioned components of the electronic device may include one or more parts, and a name of the part may vary with a type of the electronic device. The electronic device, in accordance with various embodiments of the present disclosure, may include at least one of the aforementioned components, omit some of them, or include another additional component(s). Some of the components may be combined into an entity, but the entity may perform the same functions as the components may do.

The term "module" may refer to a unit including one of hardware, software, and firmware, or a combination thereof. The term "module" may be interchangeably used with the terms "unit," "logic," "logical block," "component," or "circuit." The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium in the form of a program module. The instructions, when executed by a processor (e.g., the processor 11), may enable the processor to carry out a corresponding function. The computer-readable storage medium may be the memory 13.

The computer-readable storage medium may include a hardware device, such as, for example, hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes that are executable by various computing means using an interpreter. The aforementioned hardware devices may be configured to operate as one or more software modules to carry out embodiments of the present disclosure.

Modules or programming modules, in accordance with various embodiments of the present disclosure, may include at least one or more of the aforementioned components, omit some of them, or further include other additional components. Operations performed by modules, programming modules or other components may be carried out sequentially, simultaneously, repeatedly, or heuristically. Furthermore, some of the operations may be performed in a different order, or omitted, or may include other additional operation(s). The embodiments disclosed herein are proposed for description and understanding of the disclosed technology and do not limit the scope of the present disclosure. Accordingly, the scope of the present disclosure should be interpreted as including all changes or various embodiments based on the technical spirit of the present disclosure.

Figure 2:
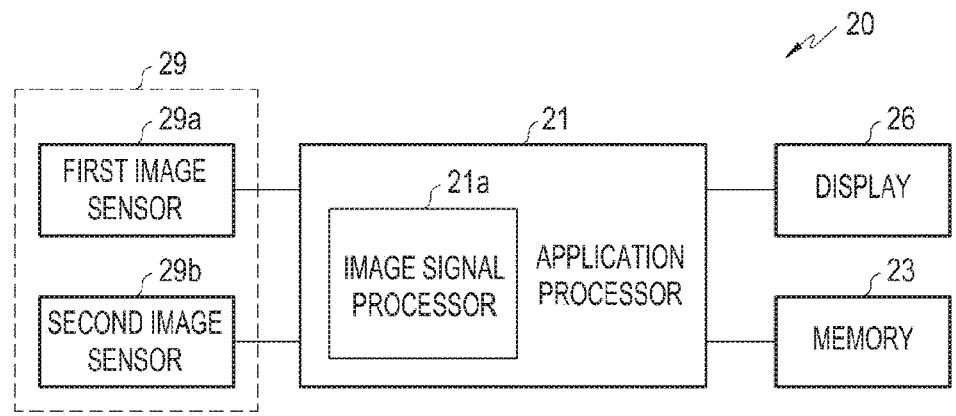
FIG. 2 is a block diagram illustrating an electronic device, according to an embodiment of the present disclosure.

FIG. 2 is a block diagram illustrating an electronic device, according to an embodiment of the present disclosure.

Referring to FIG. 2, an electronic device 20 (e.g., the electronic device 10 of FIG. 1) includes a camera module 29 (e.g., the camera module 19a of FIG. 1) including a combination of a first image sensor 29a and a second image sensor 29b, an application processor 21 (e.g., the processor 11 of FIG. 1), a display 26 (e.g., the display 16 of FIG. 1), and a memory 23 (e.g., the memory 13 of FIG. 1), and may be at least a portion of the electronic device 10 of FIG. 1.

Among the image sensors, the first image sensor 29a may have a pixel structure including a color filter that is disposed under a micro lens to transmit all wavelength bands of light. Alternatively, the first image sensor 29a may have a pixel structure not including the color filter. For example, the first image sensor 29a may be a mono-color image sensor that may detect information on all light beams (e.g., brightness information) including red light, green light, and blue light, and that may output a mono-color first image.

Among the image sensors, the second image sensor 29b may have a pixel structure including at least one color filter under a micro lens. Color filter(s) arranged in the pixel structure of the second image sensor 29b may transmit red light, green light, and blue light, respectively. According to an embodiment of the present disclosure, a color filter transmitting other colors of light may also be provided. For example, the pixels constituting the second image sensor 29b may be color image sensors outputting a second image including color information on an object and/or object area according to attributes of the color filters respectively corresponding thereto.

According to an embodiment of the present disclosure, the first and second image sensors 29a and 29b each may independently operate to output different images or may image-capture the same object and/or object area. The first and second image sensors 29a and 29b may sequentially or simultaneously image-capture the same object and/or object area. When the first and second image sensors 29a and 29b simultaneously image-capture the same object and/or object area, the electronic device 20 may synthesize an image (e.g., a first image including brightness information) obtained through the first image sensor 29a and an image (e.g., a second image including color information on, at least, red light, green light, and blue light) obtained through the second image sensor 29b to output a third image.

The first and second images may be synthesized by the application processor 21 to be output as the third image. The application processor 21 includes an image signal processor 21a that may receive image signals from the first and second image sensors 29a and 29b and synthesize and output the same. According to an embodiment of the present disclosure, the image signal processor 21a may be formed and disposed in a separate chip independent from the application processor 21.

The image signal processor 21a may perform a function, such as bac pixel correction (BPC) or reconstruction (Recon), and the image signal processor 21a may generate at least one image (e.g., the above-mentioned third image) using a mono-color image and/or color image transferred from the first and second image sensors 29a and 29b.

The image signal processor 21a may process the image using the received image information. For example, the image signal processor 21a may focus the camera module 29 using a lens driver functionally coupled with the electronic device using phase difference information received from at least one of the first and second image sensors 29a and 29b. For example, the image signal processor 21a may control the lens driver corresponding to the second image sensor 29b using the phase difference information obtained from the first image sensor 29a to focus the object coming to the second image sensor 29b. The image signal processor 21a may focus the first image sensor 29a using the phase difference information obtained from the second image sensor 29b. As another example, when phase difference information may be obtained from each of the first image sensor 29a and the second image sensor 29b, each image sensor may be focused using the higher in priority of the pieces of phase difference information or using a value (e.g., mean value or intermediate value) obtained by combining the pieces of phase difference information.

According to an embodiment of the present disclosure, the application processor 21 (and/or the image signal processor 21a) may display the processed image (e.g., the above-mentioned third image) on the display 26. The application processor 21 (and/or the image signal processor 21a) may store the processed image (e.g., the above-mentioned third image) in the memory 23.

According to an embodiment of the present disclosure, each of the first and second image sensors 29a and 29b in the electronic device 20 may operate as an independent camera for the other. Alternatively, the first and second image sensors 29a and 29b may be combined together to be operated in a single camera (e.g., the camera module 19a of FIG. 1).

Figure 3:
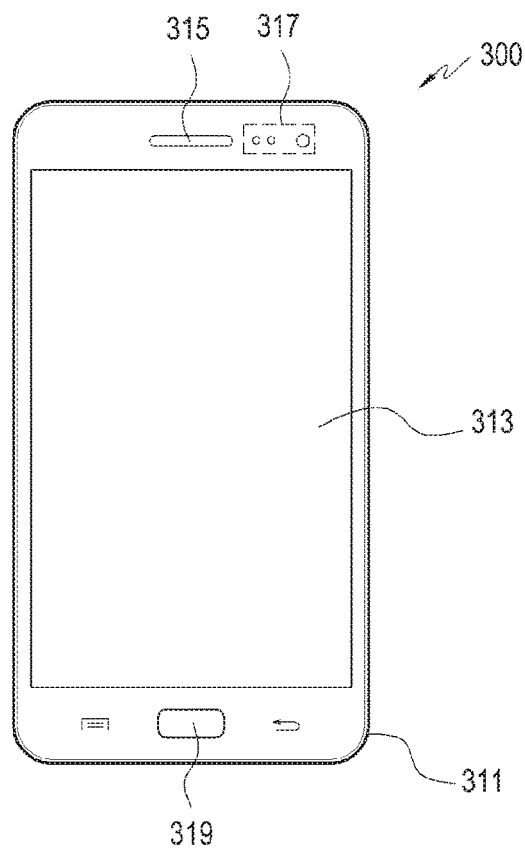
FIG. 3 is a diagram illustrating a front view of an electronic device, according to an embodiment of the present disclosure.
Figure 4:
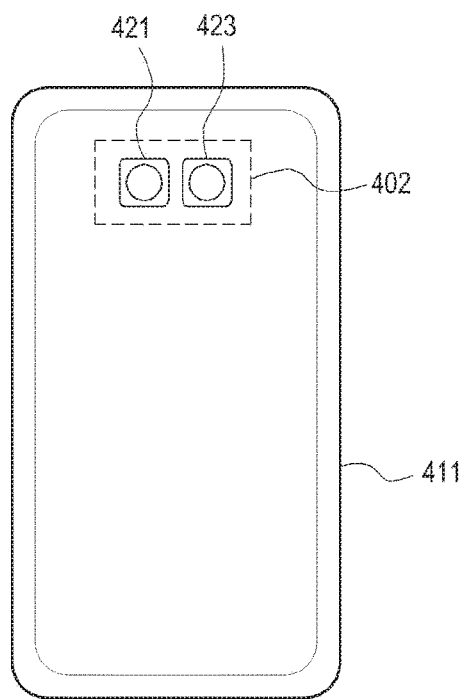
FIG. 4 is a diagram illustrating a rear view of an electronic device, according to an embodiment of the present disclosure.
Figure 5:
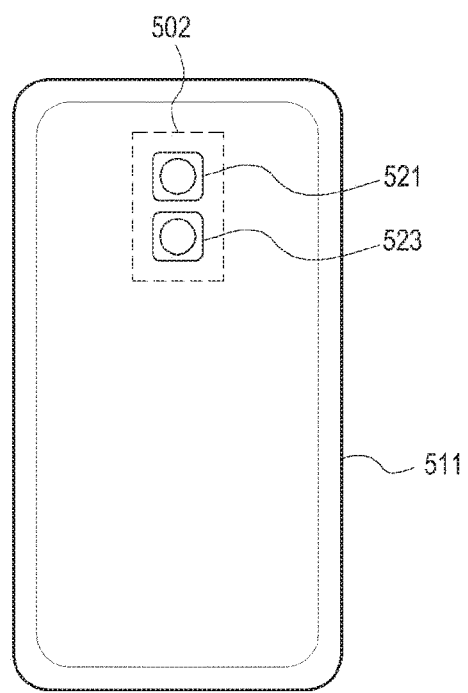
FIG. 5 is a diagram illustrating a rear view of an electronic device, according to an embodiment of the present disclosure.

FIG. 3 is a diagram illustrating a front view of an electronic device, according to an embodiment of the present disclosure. FIG. 4 is a diagram illustrating a rear view of an electronic device, according to an embodiment of the present disclosure. FIG. 5 is a diagram illustrating a rear view of an electronic device, according to an embodiment of the present disclosure.

Referring to FIG. 3, an electronic device 300 includes a display 313 (e.g., the display 16 and/or panel 16a of FIG. 1), a receiving unit 315 (e.g., the receiver 18b of FIG. 1), a sensing unit 317, and a key 319 that are disposed on a front surface of a housing 311. The display 313 may visually output various information to provide the same to the user. According to an embodiment of the present disclosure, a touch panel (e.g., the touch panel 15a of FIG. 1) may be integrated with the display 313 to provide a function as an input device. The receiving unit 315 may output an opposite party's voice to the user on a voice call. The sensing unit 317 may include a proximity sensor and an illumination sensor (e.g., the proximity sensor 14g and illumination sensor 14k of FIG. 1). For example, when the electronic device 300 approaches the user's body in a voice call mode, the sensing unit 317 may detect the approach to turn off the display 313. The sensing unit 317 may include an image capturing device. The image capturing device included in the sensing unit 317 may image-capture the user or come into use with a video call.

Referring to FIGS. 4 and 5, according to an embodiment of the present disclosure, the electronic device (e.g., the electronic device 300 of FIG. 3) includes a camera module 402 or 502 disposed on a rear surface of a housing 411 or 511. The camera module 402 or 502 includes a plurality of cameras and/or image sensors 421 and 423 or 521 and 523 (e.g., the first and second image sensors 29a and 29b of FIG. 2) functionally coupled with the processor (e.g., the image signal processor 21a of FIG. 2) of the electronic device (e.g., the electronic device 300 of FIG. 3). The plurality of cameras and/or image sensors 421 and 423 or 521 and 523 may be arranged in a parallel side by side manner, as shown in FIG. 4, or may be arranged one over the other, as shown in FIG. 5.

For brevity of description, the plurality of cameras and/or image sensors 421 and 423 or 521 and 523 are simply referred to hereinafter as "image sensors." However, this does not limit the various embodiments of the present disclosure, and the term "image sensor" may refer to an independent camera including a lens assembly.

The camera module 402 or 502 includes at least one mono-color image sensor 421 or 521 (e.g., the first image sensor 29a of FIG. 2) outputting a first image, e.g., a mono-color image, and at least one color image sensor 423 or 523 (e.g., the second image sensor 29b of FIG. 2) outputting a second image, e.g., a color image including color information on at least one of red light, green light, and blue light. The mono-color image sensor 421 or 521 may detect all wavelength bands of light including red light, green light, and blue light in a pixel and/or pixel structure to output a mono-color image. The color image sensor 423 or 523 may include a color filter a single wavelength band of light in a pixel and/or pixel structure. Thus, one pixel (and/or pixel structure) may detect light of a wavelength band corresponding to an attribute of the color filter included therein. For example, the color image sensor 423 or 523 may detect color information on, at least, red light, green light, and blue light, in an object area according to the attribute of the color filter included in each pixel. The image signal processor (e.g., the image signal processor 21a of FIG. 2) may merge the detected color information to output a color image.

According to an embodiment of the present disclosure, the mono-color image sensor 421 or 521 and the color image sensor 423 or 523 each may independently image-capture the object. The mono-color image sensor 421 or 521 and the color image sensor 423 or 523 may simultaneously and/or sequentially image-capture the same object and/or object area and synthesize the same into a single image. For example, the electronic device 300 may output the images respectively captured from the mono-color image sensor 421 or 521 and the color image sensor 423 or 523 and/or a new image obtained by synthesizing the images through the display 113 or store them in an embedded memory (e.g., the memory 23 of FIG. 2).

Figure 6:
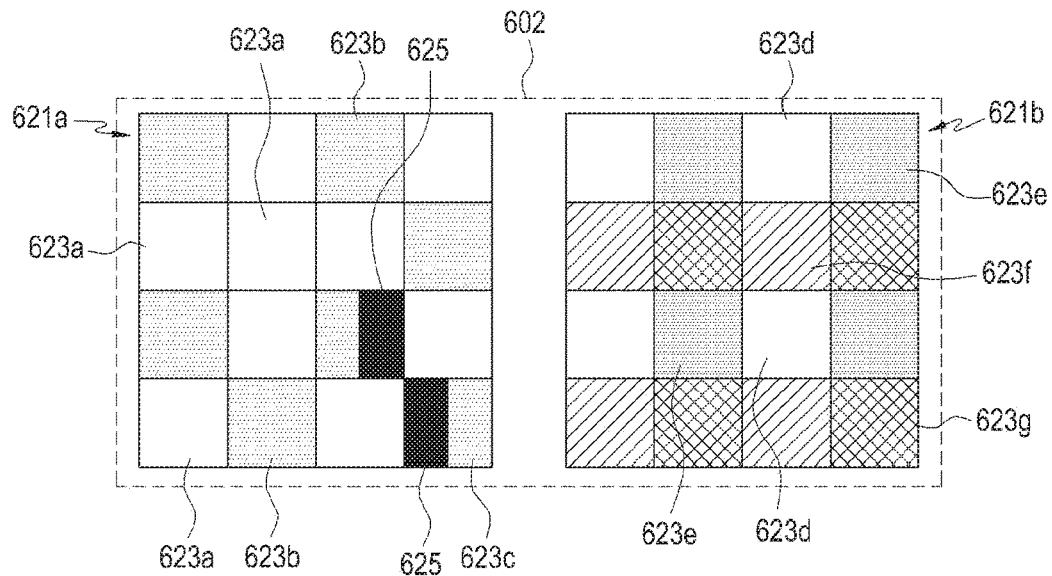
FIG. 6 is a diagram illustrating an arrangement of image sensors in an electronic device, according to an embodiment of the present disclosure.
Figure 7:
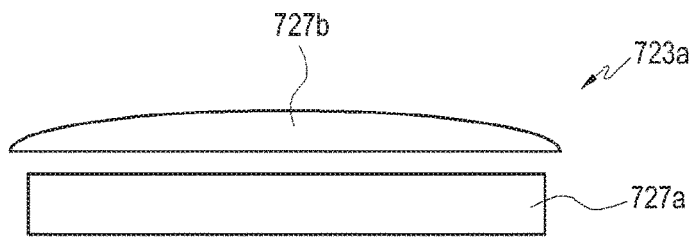
FIG. 7 is a diagram illustrating a structure of pixels arranged in a first image sensor among image sensors of an electronic device, according to an embodiment of the present disclosure.
Figure 8:
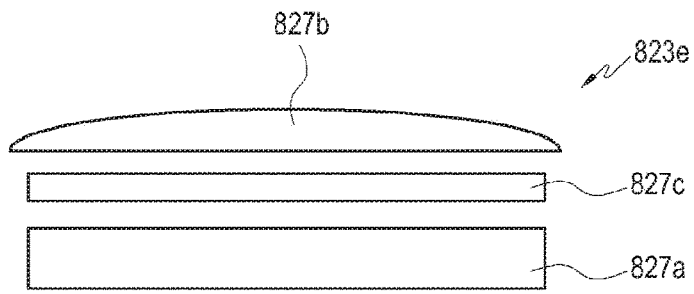
FIG. 8 is a diagram illustrating a structure of pixels arranged in a second image sensor among image sensors of an electronic device, according to an embodiment of the present disclosure.

FIG. 6 is a diagram illustrating an arrangement of image sensors in an electronic device, according to an embodiment of the present disclosure. FIG. 7 is a diagram illustrating a structure of pixels arranged in a first image sensor among image sensors of an electronic device, according to an embodiment of the present disclosure. FIG. 8 is a diagram illustrating a structure of pixels arranged in a second image sensor among image sensors of an electronic device, according to an embodiment of the present disclosure.

Embodiments are disclosed below in which a first image sensor 621a (e.g., the mono-color image sensor 421 and/or 521 of FIG. 4 and/or FIG. 5) and a second image sensor 621b (e.g., the color image sensor 423 and/or 523 of FIG. 4 and/or FIG. 5) are arranged side by side. However, the present disclosure is not limited thereto, and the first and second image sensors may be disposed at various positions with respect to each other.

Referring to FIG. 6, according to an embodiment of the present disclosure, the electronic device, for example, a camera module 602, includes the first image sensor 621a outputting a first image and the second image sensor 621b outputting a second image. The first image sensor 621a may include no color filter, for example. According to an embodiment of the present disclosure, the second image sensor 621b may detect the color of at least one of red light, green light, and blue light. For example, pixels (and/or pixel structure) 623d, 623e, 623f, and 623g of the second image sensor 621b each may be a color filter transmitting at least one wavelength band of light among red light, green light, and blue light. The first image sensor 621a may include a filter having a higher light transmittance than that of the color filter of the second image sensor 621b. For example, pixels (and/or pixel structure) 623a and 623b of the first image sensor 621a each may detect light of a broader wavelength band of light than that which is detected by the color filter of the second image sensor 621b. The pixels (and/or pixel structure) 623a and 623b of the first image sensor 621a may include a color filter transmitting all wavelength bands of light.

According to an embodiment of the present disclosure, the first image sensor 621a may include at least one phase difference pixel 623c. In one embodiment, the at least one phase difference pixel 623c include a light blocking film 625 disposed in a portion of a light receiving area (and/or pixel area), thereby allowing itself a phase separation structure. The phase difference pixel 623c including the light blocking film 625, and the resultant phase separation structure, may have reduced light receiving efficiency as compared with other pixels having no light blocking film. A pair of phase difference pixels 623c may be made that are arranged adjacent to each other or partially spaced apart from each other. The light blocking film 625 may be disposed on a right side of one of the phase difference pixels 623c made in a pair and may be disposed on a left side of the other. For example, the respective light blocking films 625 of the phase difference pixels 623c made in a pair may be arranged at positions offset with respect to each other.

Referring to FIG. 7, pixel(s) 723a (and/or pixel structure, e.g., the pixel(s) 623a of the first image sensor 621a of FIG. 6) of the first image sensor (e.g., the first image sensor 621a of FIG. 6) may detect light coming through a first micro lens 727b using a first light receiving sensor (e.g., a photo diode 727a). For example, the photo diode 727a may convert light coming through the first micro lens 727b into an electrical signal. According to an embodiment of the present disclosure, when the pixel(s) 723a do not include a color filter, all wavelength bands of light may come into the photo diode 727a, and thus, the first image sensor 621a may output a black and/or gray color image. Further referring to FIG. 8, pixel(s) 823e (and/or pixel structure, e.g., the pixels 623d, 623e, 623f, and 623g of FIG. 6) of the second image sensor 621b may include a color filter 827c transmitting at least one of red light, green light, and blue light, between a second micro lens 827b and a second photo diode 827a to detect light corresponding to an attribute of each color filter 827c. For example, the second image sensor 621b may output an image (e.g., a color image) including color information.

According to an embodiment of the present disclosure, some pixel(s) of the second image sensor 621b might not include a color filter. For example, some pixel(s) of the second image sensor 621b may detect all wavelength bands of light. When the first image sensor (e.g., the first image sensor 621a of FIG. 6) is a mono-color image sensor, the pixels of the second image sensor 621b may be formed as pixels each detecting one of red light, green light, and blue light.

According to an embodiment of the present disclosure, the electronic device (e.g., the electronic device 300 of FIG. 3), e.g., an imaging device (e.g., the camera module 602 of FIG. 6), may include at least one phase difference pixel 623c for providing an autofocusing function and at least two sensor groups for providing a high-dynamic range (HDR) function. The at least two sensor groups may have different exposure settings. For example, pixels 623a of a first sensor group of the at least two sensor groups may be lower in sensitivity than pixels 623b of a second sensor group. The pixels 623a (e.g., light receiving sensors) of the first sensor group of the at least two sensor groups may be set to have a shorter exposure time than that of the pixels 623b of the second sensor group. Such exposure setting may be varied depending on the sensitivity of the photo diode included in each pixel, transmittance of the micro lens, or settings in the stage of forming the camera module 602. A pixel or sensor group relatively low in sensitivity or relatively short in exposure time (and/or exposure quantity) may be referred to as a short-exposure pixel (e.g., the pixel 621a of the first sensor group). Further, a pixel or sensor group relatively high in sensitivity or relatively long in exposure time (and/or exposure quantity) may be referred to as a long-exposure pixel (e.g., the pixel 621b of the second sensor group).

According to an embodiment of the present disclosure, some of the pixels constituting the first image sensor 621a may be formed or set to be short-exposure pixels 623a, while the rest may be formed or set to be long-exposure pixels 623b. When an object (and/or object area) is image-captured through the first image sensor 621a, an image detected by the short-exposure pixels 623a may be outputted brighter than an image detected by the long-exposure pixels 623b. The above-described electronic device (e.g., the electronic device 300 of FIG. 3 and/or image signal processor (e.g., the image signal processor 21a of FIG. 2) may synthesize two images different in brightness to output one image, thereby providing an HDR function. For example, an image of a brighter portion as image information detected through the short-exposure pixels 623a and an image of a darker portion as image information detected through the long-exposure pixels 623b may be synthesized into a single image having a gray level ratio that is clearly represented, thereby compensating for image quality deterioration due to a difference in brightness in the object (and/or object area).

The short-exposure pixels 623a and the long-exposure pixels 623 may be arranged in the first image sensor 621a, for example, the mono-color image sensor (e.g., the mono-color image sensor 421 and/or 521 of FIG. 4 and/or FIG. 5). For example, at least two sensor groups for implementing an HDR function may be arranged in the mono-color image sensor not including a color filter to receive more light (than the pixel(s) arranged in the color image sensor), outputting an image including brightness information on the object (and/or object area).

Figure 9:
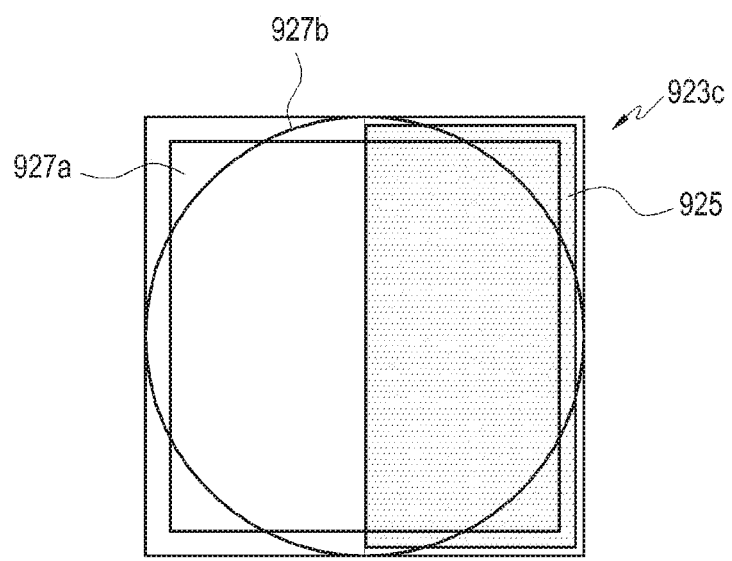
FIG. 9 is a diagram illustrating a plan view of a structure of phase difference pixels arranged in at least one of image sensors of an electronic device, according to an embodiment of the present disclosure.
Figure 10:
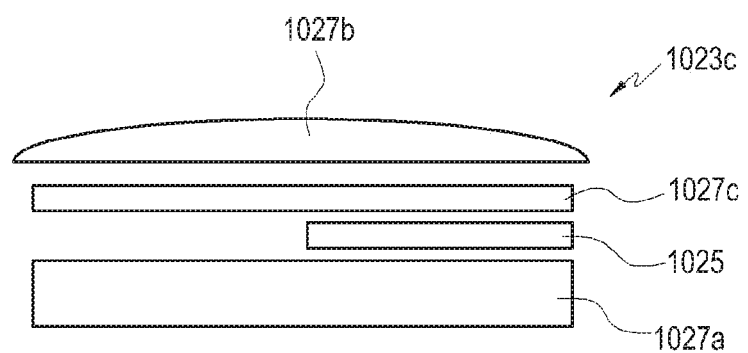
FIG. 10 is a diagram illustrating a cross-sectional view of a structure of phase difference pixels arranged in at least one of image sensors of an electronic device, according to an embodiment of the present disclosure.

FIG. 9 is a diagram illustrating a plan view of a structure of phase difference pixels arranged in at least one of the image sensors of an electronic device, according to an embodiment of the present disclosure. FIG. 10 is a diagram illustrating a cross-sectional view of a structure of phase difference pixels arranged in at least one of the image sensors of an electronic device, according to an embodiment of the present disclosure.

Further referring to FIGS. 9 and 10, the image sensor (e.g., the first image sensor 621a of FIG. 6) may include at least one of light receiving sensor (e.g., a photo diode 927a or 1027a of FIGS. 9 and 10). For example, the photo diode 927a or 1027a may convert light coming through the first micro lens 927b or 1027b into an electrical signal.

According to an embodiment of the present disclosure, phase difference pixel 923c or 1023c include a light blocking film 925 or 1025 disposed in a portion of a light receiving area (and/or pixel area), thereby allowing itself a phase separation structure. The phase difference pixel 923c or 1023c including the light blocking film 925 or 1025, and resultantly a phase separation structure, may have reduced light receiving efficiency as compared with other pixels having no light blocking film. According to an embodiment of the present disclosure, a pair of phase difference pixels 923c or 1023c may be made that are arranged adjacent to each other or partially spaced apart from each other. The light blocking film 925 or 1025 may be disposed on a right side of one of the phase difference pixels 923c or 1023c made in a pair and may be disposed on a left side of the other. For example, the respective light blocking films 925 or 1025 of the phase difference pixels 923c or 1023c made in a pair may be arranged at positions offset with respect to each other. For example, when one of the phase difference pixels 923c or 1023c made in a pair detects light at a side of an exit pupil of a micro lens 927b or 1027b, the other may detect light at an opposite side of the exit pupil of the micro lens 927b or 1027b. The camera module (e.g., the camera module 602 of FIG. 6 and/or the above-described electronic device (e.g., the electronic device 300 of FIG. 3) may compare phase differences detected from the phase difference pixels 923c or 1023c to measure and/or detect a focusing state of the camera module (e.g., the camera module 602 of FIG. 6).

According to an embodiment of the present disclosure, since the phase difference pixel(s) 923c or 1023c is a pixel of a phase separation structure having the light blocking film 925 or 1025 disposed therein, and thus, it exhibits reduced light receiving efficiency, the phase difference pixel(s) 923c or 1023c may be arranged in the first image sensor 621a (e.g., the mono-color image sensor), receiving relatively more light of the first and second image sensor (e.g., the first and second image sensor 621a and 621b of FIG. 6). When short-exposure pixels (e.g., the short-exposure pixels 623a of FIG. 6) and long-exposure pixels (e.g., the long-exposure pixels 623b of FIG. 6) are arranged in the first image sensor 621a, the phase difference pixels 923c or 1023c may be formed by arranging the light blocking films 925 or 1025 in some of the long-exposure pixels. Although FIG. 10 illustrates an example in which the phase difference pixel 1023c includes a color filter 1027c, the color filter 1027c may be excluded from the phase difference pixel when the phase difference pixel is included in some of the pixels of the mono-color image sensor. When phase difference pixels are arranged in some of the pixels of the mono-color image sensor, the color filter 1027c may have a higher transmittance than those arranged in the pixels of the color image sensor or may transmit all wavelength bands of light.

According to an embodiment of the present disclosure, the phase difference pixels 923c or 1023c or sensor groups (e.g., the short-exposure pixels 623a or long-exposure pixels 623b of FIG. 6) for an HDR function may be arranged in the second image sensor 621b, (e.g., the color image sensor). Other various embodiments regarding the arrangement of the phase difference pixels 923c or 1023c or sensor groups for an HDR function are described in greater detail below.

Figure 11:
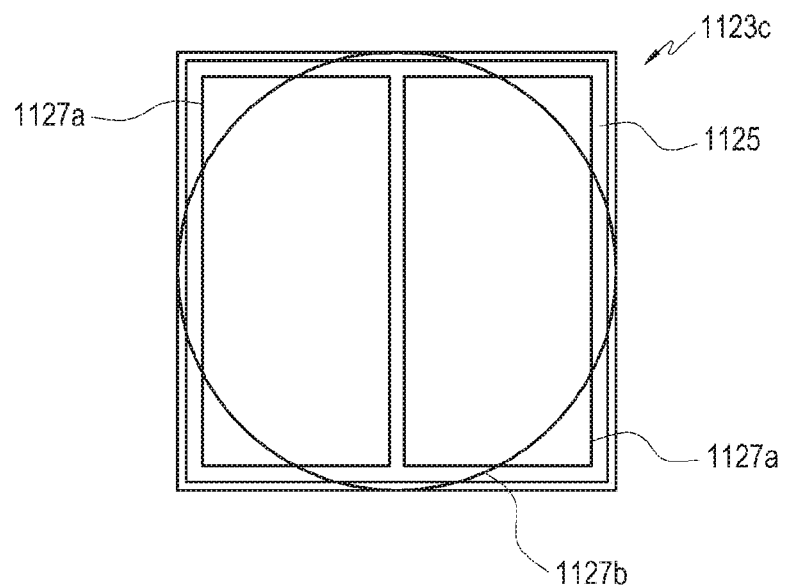
FIG. 11 is a diagram illustrating a plan view of a structure of phase difference pixels arranged in at least one of image sensors of an electronic device, according to an embodiment of the present disclosure.
Figure 12:
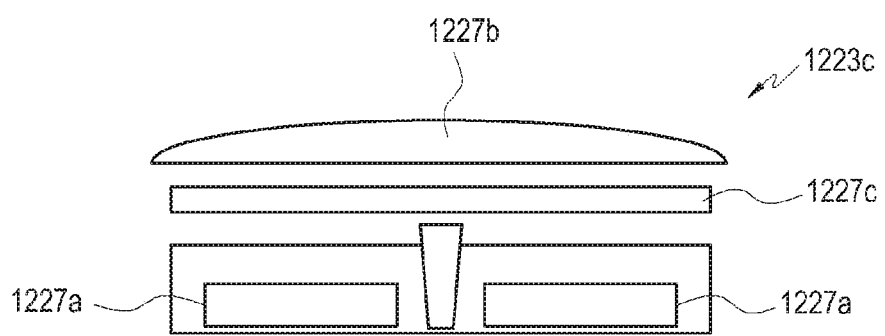
FIG. 12 is a diagram illustrating a cross-sectional view of a structure of phase difference pixels arranged in at least one of image sensors of an electronic device, according to an embodiment of the present disclosure.

FIG. 11 is a diagram illustrating a plan view of a structure of phase difference pixels arranged in at least one of the image sensors of an electronic device, according to an embodiment of the present disclosure. FIG. 12 is a cross-sectional view illustrating a structure of phase difference pixels arranged in at least one of the image sensors of an electronic device, according to an embodiment of the present disclosure.

Referring to FIGS. 11 and 12, according to an embodiment of the present disclosure, a phase difference pixel 1123c or 1223c of the electronic device (e.g., the electronic device 300 of FIG. 3), for example, the above-described camera module (e.g., the camera module 602 of FIG. 6), may include at least a pair of light receiving sensors 1125 (e.g., photo diodes 1127a or 1227a), arranged side by side, to have the same light receiving area (and/or area) as other pixel(s). The phase difference pixel 1123c or 1223c may output each of left/right (and/or upper/lower) image information respectively received from the at least one pair of photo diodes 1127a or 1227a. The photo diode 1127a or 1227a may convert light coming through a micro lens 1127b or 1227b into an electrical signal.

According to an embodiment of the present disclosure, the phase difference pixel 1123c or 1223c may include a color filter 1227c and the color filters may include a red light filter R, a green light filter G, a blue light filter B or a filter transmitting or blocking a different color of light. The color filters may have a different transmittance depending on the wavelength of incident light. The phase difference pixel 1123c or 1223c may not include a color filter and/or the color filter 1227c may be a transparent color filter transmitting all wavelength bands of light may have a high exposure quantity ratio as compared with pixels including a red light filter R, green light filter G, and blue light filter B that are similar in exposure quantity ratio.

The processor (e.g., the image signal processor 21a of FIG. 2) may detect a focusing state from the phase difference of the left/right (and/or upper/lower) image information each outputted from the phase difference pixel 1123c or 1223c. According to information regarding the detected focusing state, the processor (e.g., the image signal processor 21a of FIG. 2) may drive an actuator functionally coupled thereto to focus a lens assembly corresponding to the first and/or second image sensor (e.g., the first and/or second image sensor 621*a* and/or 621*b* of FIG. 6).

According to an embodiment of the present disclosure, when the phase difference pixel has at least a pair of photo diodes, at least one phase difference pixel may be provided at any position of the pixels constituting the image sensor (e.g., the first and/or second image sensor 621*a* and/or 621*b* of FIG. 6). At least one phase difference pixel having at least a pair of photo diodes may be disposed in a long-exposure pixel of the mono-color image sensor (e.g., the first image sensor 621*a* of FIG. 6). Alternatively, when at least one phase difference pixel having at least a pair of photo diodes is disposed in a color image sensor (e.g., the second image sensor 621*b* of FIG. 6), it may be disposed in a pixel detecting one of red light, green light, and blue light, and may be set to a long-exposure pixel.

For example, the above-described phase difference pixel(s) may be arranged to correspond to or be included in a pixel, pixel structure, and/or light receiving sensor set to have a longer exposure time than other pixels among the pixels of the above-described first and/or second image sensor. According to an embodiment of the present disclosure, when the above-described phase difference pixel(s) is structured to include at least a pair of photo diodes, any one of the pixels of the first and/or second image sensor may be set to the phase difference pixel. Alternatively, when the above-described phase difference pixel(s) is structured to include at least a pair of photo diodes, all of the pixels of at least one of the first and/or second image sensor may be set to phase difference pixels. Some of the pixels (and/or light receiving sensors) of the second image sensor are set to have a longer exposure time than other pixels (and/or light receiving sensors), the phase difference pixels may be included in at least some of the pixels (and/or light receiving sensors) set to have the longer exposure time.

According to an embodiment of the present disclosure, when the electronic device and/or camera module includes lens assemblies respectively corresponding to the first and second image sensor (e.g., the first and/or second image sensor 621*a* and/or 621*b* of FIG. 6), the phase difference pixel(s) 923*c*, 1023*c*, 1123*c*, or 1223*c* may be disposed in each of the first and second image sensor (e.g., the first and/or second image sensor 621*a* and/or 621*b* of FIG. 6). For example, information on a focusing state may be detected from each of the first and second image sensor (e.g., the first and/or second image sensor 621*a* and/or 621*b* of FIG. 6), and their respective corresponding lens assemblies may be focused based on the information.

According to an embodiment of the present disclosure, the phase difference pixel(s) 923*c*, 1023*c*, 1123*c*, or 1223*c* may be disposed in one of the first and second image sensor (e.g., the first and/or second image sensor 621*a* and/or 621*b* of FIG. 6). For example, the lens assemblies respectively corresponding to the first and second image sensor (e.g., the first and/or second image sensor 621*a* and/or 621*b* of FIG. 6) may be focused based on information regarding the focusing state detected from the phase difference pixel(s) 923*c*, 1023*c*, 1123*c*, or 1223*c* disposed in one of the first and second image sensor (e.g., the first and/or second image sensor 621*a* and/or 621*b* of FIG. 6).

Figure 13:
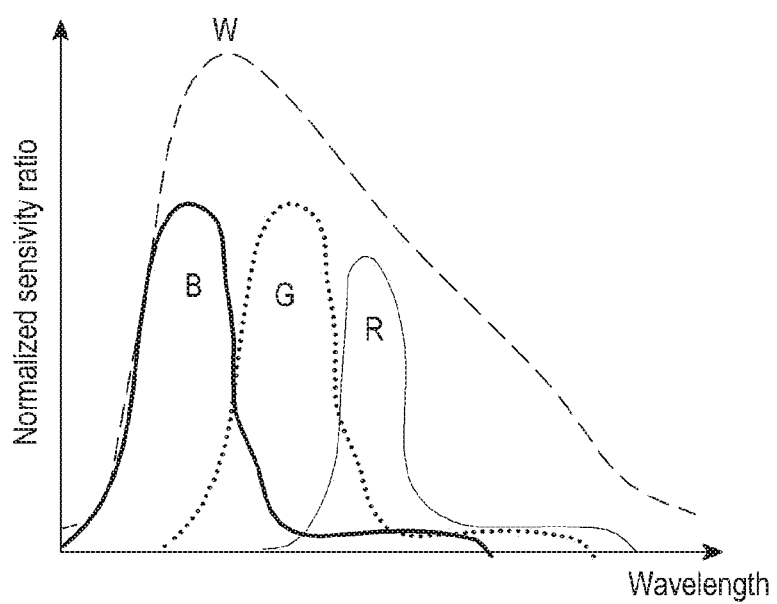
FIG. 13 is a graph illustrating characteristics of color filters arranged in one of image sensors of an electronic device, according to an embodiment of the present disclosure.

FIG. 13 is a graph illustrating characteristics of color filters arranged in one of image sensors of an electronic device, according to an embodiment of the present disclosure.

Referring to FIG. 13, the pixel and/or pixel structure(s) of, at least, the color image sensor (e.g., the second image sensor 621*b* of FIG. 6) of the image sensors (e.g., the first and/or second image sensor 621*a* and/or 621*b* of FIG. 6) each may have a color filter, and the color filters may include a red light filter R, a green light filter G, a blue light filter B or a filter transmitting or blocking a different color of light. The color filters may have a different transmittance depending on the wavelength of incident light. According to an embodiment of the present disclosure, a pixel not including a color filter and/or a transparent color filter transmitting all wavelength bands of light may have a high exposure quantity ratio as compared with pixels including a red light filter R, green light filter G, and blue light filter B that are similar in exposure quantity ratio. Thus, when the same exposure time applies, pixels not including a color filter may receive more light than the other pixels, and thus, exhibit a relatively higher sensitivity. Even when an image sensor is a color image sensor including a color filter(s), some of pixels (and/or pixel structure) constituting the color image sensor may be constituted of pixels detecting all wavelength bands of light. For example, some of the pixels of the color image sensor might not include a color filter or may include a color filter transmitting all wavelength bands of light.

Figure 14:
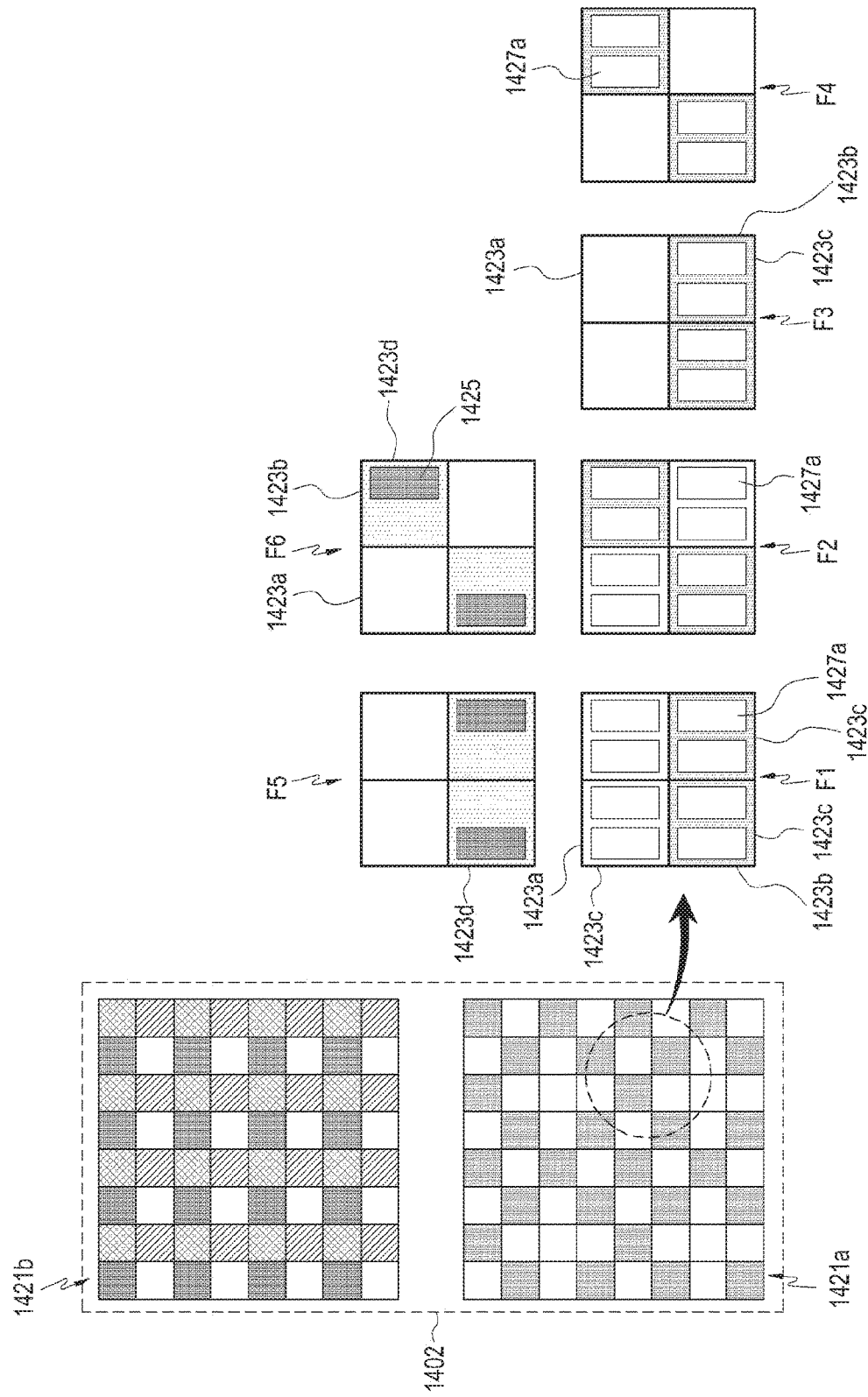
FIG. 14 is a diagram illustrating an arrangement of phase difference pixels, short-exposure pixels, and/or long-exposure pixel(s) in an electronic device, according to an embodiment of the present disclosure.

FIG. 14 is a diagram illustrating an arrangement of phase difference pixels, short-exposure pixels, and/or long-exposure pixel(s) in an electronic device, according to an embodiment of the present disclosure.

Referring to FIG. 14, according to an embodiment of the present disclosure, the electronic device (e.g., the electronic device 300 of FIG. 3), for example, a camera module 1402 (e.g., the camera module 602 of FIG. 6), may include a first image sensor 1421*a* (e.g., a mono-color image sensor) and a second image sensor 1421*b* (e.g., a color image sensor). In the camera module 1402, phase difference pixels 1423*c* and 1423*d*, which obtain information on a focusing state and sensor groups (e.g., a short-exposure pixel 1423*a* and long-exposure pixel 1423*b*) for providing an HDR function, all may be arranged on the first image sensor 1421*a* in various manners.

For example, when the phase difference pixels 1423*c* and 1423*d* are structured to include at least a pair of photo diodes 1427*a* (e.g., phase difference pixels denoted with reference numeral 1423*c*), all of the pixels constituting the first image sensor 1421*a* may be formed of phase difference pixels, as shown in a first and second arrangement F1 and F2. According to an embodiment of the present disclosure, when the phase difference pixels 1423*c* and 1423*d* are structured to include at least the pair of photo diodes 1427*a* (e.g., phase difference pixels denoted with the reference numeral 1423*c*), and some pixels of the first image sensor 1421*a* are formed of phase difference pixels, the phase difference pixels 1423*c* may be arranged in at least some of the long-exposure pixels 1423*b*, as shown in a third and fourth arrangement F3 and F4. For example, some pixels of the first image sensor 1421*a* may be phase difference pixels 1423*c* and long-exposure pixels 1423*b*. Some pixels of the first image sensor 1421*a* may alternatively be phase difference pixels and short-exposure pixels. For example, when the phase difference pixels include at least a pair of light receiving sensors (e.g., photo diodes), any pixel(s) of the image sensor (e.g., the first image sensor 1421*a*) may be set to phase difference pixels.

According to an embodiment of the present disclosure, the phase difference pixels 1423*c* and 1423*d* may be structured so that a partial light receiving area of the photo diodes is hidden by a light blocking film 1425 (e.g., the light blocking film 1025 of FIG. 10) (e.g., the phase difference pixel denoted with the reference numeral 1423d). When a portion of the light receiving area is hidden by a light blocking film, some of the pixels of the first image sensor 1421a may be formed or set to the phase difference pixels 1423d, as shown in a fifth and sixth arrangement F5 and F6. Since the phase difference pixel 1423d having the light blocking film 1425 disposed thereon may have a reduced sensitivity as compared with other pixels (not including a light blocking film), some of the long-exposure pixels 1423b may be formed or set to phase difference pixels.

Although an embodiment is described in which the phase difference pixel (e.g., the phase difference pixel 1423c of FIG. 14) includes a plurality of photo diodes (e.g., photo diodes 1427a of FIG. 14) that are arranged left to right, the present disclosure is not limited thereto. For example, when the phase difference pixel includes a plurality of photo diodes, the plurality of photo diodes may be arranged one over another in the phase difference pixel. In some embodiments, some phase difference pixels may include a plurality of photo diodes arranged left to right, while other phase difference pixels may include a plurality of photo diodes arranged one over another.

The above-described electronic device may drive the lens assembly corresponding to the first and/or second image sensor 1421a and/or 1421b through, for example, phase difference information detected from the phase difference pixels 1423c and 1423d, to perform a focusing operation.

According to an embodiment of the present disclosure, a first image (e.g., a mono-color image including brightness information) outputted from the first image sensor 1421a and a second image outputted from the second image sensor 1421b may be synthesized into a third image. The second image sensor 1421b may output a color image including color information on at least one of red light, green light, and blue light. As the color information of the color image is synthesized with the first image including the brightness information, the third image may be outputted as a color image.

Figure 15:
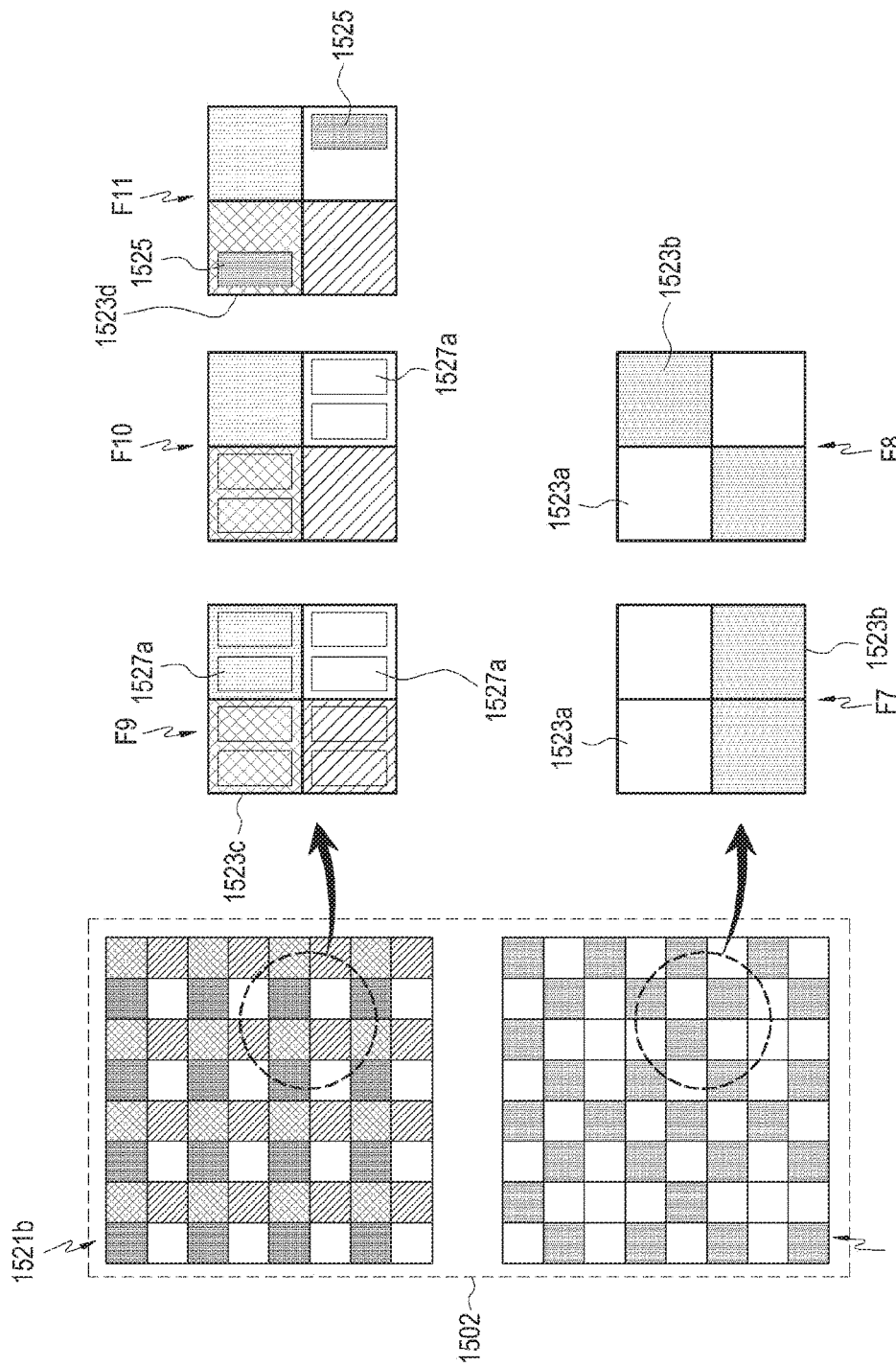
FIG. 15 is a diagram illustrating an arrangement of phase difference pixels, short-exposure pixels, and/or long-exposure pixel(s) in an electronic device, according to an embodiment of the present disclosure.

FIG. 15 is a diagram illustrating an arrangement of phase difference pixels, short-exposure pixels, and/or long-exposure pixel(s) in an electronic device, according to an embodiment of the present disclosure.

Referring to FIG. 15, the electronic device (e.g., the electronic device 300 of FIG. 3), e.g., a camera module 1502 includes a first image sensor 1521a outputting a mono-color first image and a second image sensor 1521b outputting a second image including color information on at least one of red light, green light, and blue light. The camera module 1502 may include phase difference pixels 1523c and 1523d detecting information regarding a focusing state and sensor group(s) (e.g., short-exposure pixel 1523a and long-exposure pixel 1523b) having different exposure times to provide an HDR function. According to an embodiment of the present disclosure, some of the pixels of the first image sensor 1521a may be formed or set to be short-exposure pixels 1523a, while some others may be formed or set to be long-exposure pixels 1523b, as shown in a seventh and eighth arrangement F7 and F8.

According to an embodiment of the present disclosure, the phase difference pixel(s) 1523c may constitute at least some of the pixels of the second image sensor 1521a. For example, as shown in a ninth arrangement F9, when the phase difference pixel(s) 1523c and 1523d includes at least a pair of photo diodes 1527a (e.g., the phase difference pixel denoted with reference numeral 1523c), all of the pixels of the second image sensor 1521b may be formed of phase difference pixels. In another embodiment, as shown in a tenth arrangement F10, even when the phase difference pixel(s) 1523c includes at least the pair of photo diodes 1527a, some of the pixels of the second image sensor 1521b may be formed of phase difference pixels. In another embodiment, as shown in an eleventh arrangement F11, the phase difference pixel(s) 1523c and 1523d may have a pixel structure (e.g., phase difference pixel denoted with the reference numeral 1523d) including a light blocking film 1525 (e.g., the light blocking film 1025 of FIG. 10), and some of the pixels of the second image sensor 1521b may be formed of phase difference pixels. For example, when the phase difference pixels include at least a pair of photo diodes, any pixels of the image sensor (e.g., the second image sensor 1521b) may be set to phase difference pixels.

According to an embodiment of the present disclosure, the electronic device, e.g., the camera module 1502, may synthesize a first image from the first image sensor 1521a and a second image from the second image sensor 1521b to output a third image. When image capturing is performed in an environment where a sufficient amount of light (e.g., sunshine) is secured, the electronic device (e.g., the electronic device 300 of FIG. 3) may output an image captured through the second image sensor 1521b. When image capturing is performed with an insufficient amount of light (e.g., a low-illuminance mode) or in an HDR mode, the electronic device may synthesize the first and second image and output the third image.

Figure 16:
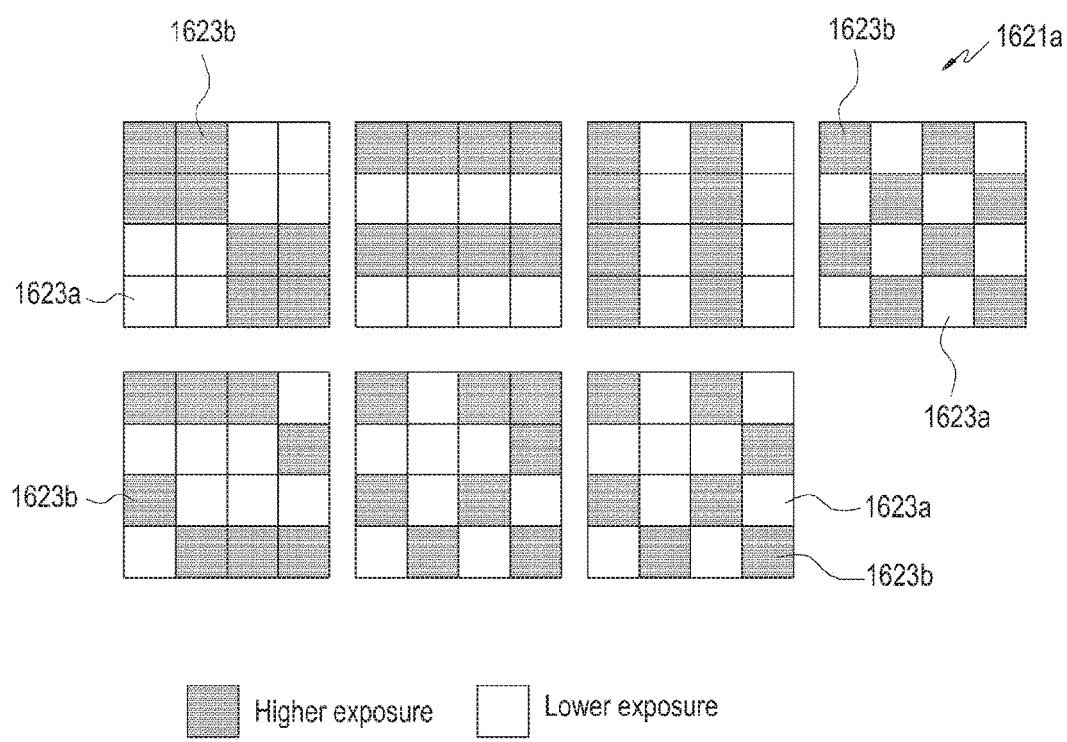
FIG. 16 is a diagram illustrating various arrangements of short-exposure pixels and/or long-exposure pixel(s) in an electronic device, according to an embodiment of the present disclosure.

FIG. 16 is a diagram illustrating various arrangements of short-exposure pixels and/or long-exposure pixel(s) in an electronic device, according to an embodiment of the present disclosure.

As described above, according to an embodiment of the present disclosure, the electronic device equipped with an image sensor 1621 (e.g., the image sensor(s) 621a or 621b of FIG. 6) and/or camera module (e.g., the camera module 602 of FIG. 6) may include at least two sensor groups (e.g., the short-exposure pixel(s) 623a and/or long-exposure pixel(s) 623b of FIG. 6) having different exposure settings (e.g., exposure times) to provide an HDR function. Here, the term "exposure setting" may mean the sensitivity, exposure time, and/or exposure quantity of each pixel. Referring to FIG. 16, short-exposure pixels 1623a and long-exposure pixels 1623b may be arranged regularly and/or irregularly so that the pixels are evenly distributed on the overall area where the pixels are arranged. The electronic device (e.g., the electronic device 300 of FIG. 3) and/or image signal processor (e.g., the image signal processor 21a of FIG. 2) may synthesize a bright area of an image detected through the short-exposure pixel 1623a and a dark area of the image detected through the long-exposure pixel 1623b and output an image (e.g., an HDR image). For example, the HDR function may enhance the quality of an image captured in a low-illuminance environment and/or an environment that exhibits a large contrast in the object area. In the embodiments set forth above, although an example is described in which the short-exposure pixels 1623a and the long-exposure pixels 1623b are arranged in the first image sensor, e.g., the mono-color image sensor, some of the pixels included in the color image sensor may be set to short-exposure pixels while others may be set to long-exposure pixels.

Figure 17:
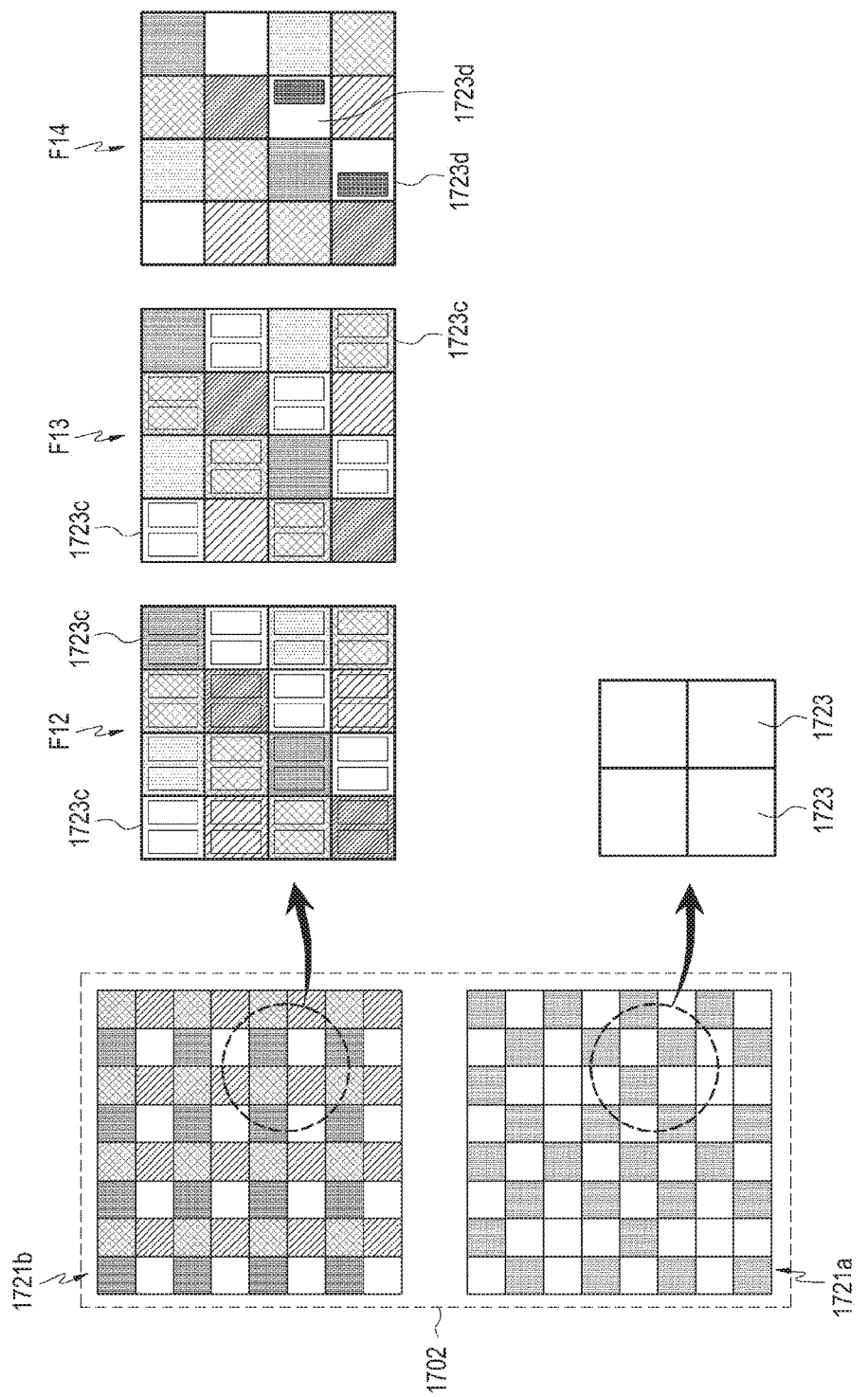
FIG. 17 is a diagram illustrating an arrangement of phase difference pixels, short-exposure pixels, and/or long-exposure pixel(s) in an electronic device, according to an embodiment of the present disclosure.

FIG. 17 is a diagram illustrating an arrangement of phase difference pixels, short-exposure pixels, and/or long-exposure pixel(s) in an electronic device, according to an embodiment of the present disclosure.

Referring to FIG. 17, according to an embodiment of the present disclosure, the electronic device (e.g., the electronic device 300 of FIG. 3), for example, a camera module 1702, includes a first image sensor 1721*a* (e.g., a mono-color image sensor) and a second image sensor 1721*b* (e.g., a color image sensor). In the camera module 1702, phase difference pixels 1723*c* and 1723*d* for obtaining information on a focusing state and sensor groups (e.g., the short-exposure pixel 1623*a* and long-exposure pixel 1623*b* of FIG. 16) for providing an HDR function all may be arranged on the second image sensor 1721*b* in various manners.

As shown in FIG. 17, each of the pixels in the second image sensor 1721*b* may include a color filter (e.g., the color filter 827*c* of FIG. 8), and may be disposed in one of different sensor groups (e.g., the short-exposure pixel 1623*a* and long-exposure pixel 1623*b* of FIG. 16). For example, the pixels of the second image sensor 1721*b* may be formed or set to short-exposure pixels or long-exposure pixels while simultaneously detecting color information corresponding to the attribute of the color filter. However, it should be noted that FIG. 17 illustrates different pixels in the second image sensor 1721*b* to distinguish the color filters respectively corresponding to the pixels but does not illustrate an arrangement of short-exposure pixels and long-exposure pixels. The short-exposure pixels and long-exposure pixels constituting the second image sensor 1721*b*, as shown in FIG. 17, may have various arrangements as shown in FIG. 16.

According to an embodiment of the present disclosure, when the phase difference pixels 1723*c* and 1723*d* are structured to include at least a pair of photo diodes (e.g., phase difference pixels denoted with reference numeral 1723*c*), all of the pixels constituting the second image sensor 1721*b* may be formed of phase difference pixels, as shown in a twelfth arrangement F12. Alternatively, the phase difference pixel 1723*c* is structured to include at least a pair of photo diodes, and some of the pixels constituting the second image sensor 1721*b* may be formed of phase difference pixels as shown in a thirteenth arrangement F13. When some pixel(s) of the second image sensor 1721*b* are formed or set to phase difference pixel(s), the phase difference pixel 1723*c* may be disposed in at least some of the long-exposure pixel(s). For example, some pixels of the second image sensor 1721*b* may be phase difference pixels 1723*c* and long-exposure pixels. Alternatively, when the phase difference pixel includes at least a pair of photo diodes, any pixel(s) of the image sensor (e.g., the second image sensor 1721*b*) may be set to phase difference pixel(s). Some pixels of the second image sensor 1721*b* may alternatively be phase difference pixels 1723*c* and short-exposure pixels. When the phase difference pixel 1723*c*, short-exposure pixel, and long-exposure pixel all are arranged in the second image sensor 1721*b*, the pixels 1723 of the first image sensor 1721*a* may have the same structure.

According to an embodiment of the present disclosure, the phase difference pixels 1723*c* and 1723*d* may be structured so that a partial light receiving area of the photo diodes is hidden by a light blocking film (e.g., the light blocking film 1025 of FIG. 10) (e.g., the phase difference pixel denoted with reference numeral 1723*d*). When a partial light receiving area of the photo diode is hidden by a light blocking film, some of the pixels of the image sensor (e.g., the second image sensor 1721*b*) may be formed or set to phase difference pixels 1723*d* as shown in a fourteenth arrangement F14. Since the phase difference pixel 1723*d* having the light blocking film disposed thereon may have a reduced sensitivity as compared with other pixels (not including a light blocking film), some of the long-exposure pixels may be formed or set to phase difference pixels.

The above-described electronic device (e.g., the electronic device 300 of FIG. 3) may drive the lens assembly corresponding to the first and/or second image sensor 1721*a* and/or 1721*b* through, for example, phase difference information detected from the phase difference pixel(s) to perform a focusing operation.

According to an embodiment of the present disclosure, a first image (e.g., a mono-color image including brightness information) outputted from the first image sensor 1721*a* and a second image outputted from the second image sensor 1721*b* may be synthesized into a third image. The second image sensor 1721*b* may output a color image including color information on at least one of red light, green light, and blue light. As the color image is synthesized with the first image including the brightness information, the third image may be outputted as a color image.

According to an embodiment of the present disclosure, the electronic device, e.g., the camera module 1702, may provide an HDR function that synthesizes a bright area of an image detected from the short-exposure pixel(s) of the second image sensor 1721*b* and a dark area of the image detected from the long-exposure pixel(s) and outputs the third image. In an environment where a sufficient amount of light is provided, the camera module 1702 may output an image from the second image sensor 1721*b*, and in a low-illuminance mode or HDR mode, the camera module 1702 may synthesize the image outputted from the second image sensor 1721*b* and the image outputted from the first image sensor 1721*a* to output the third image.

Figure 18:
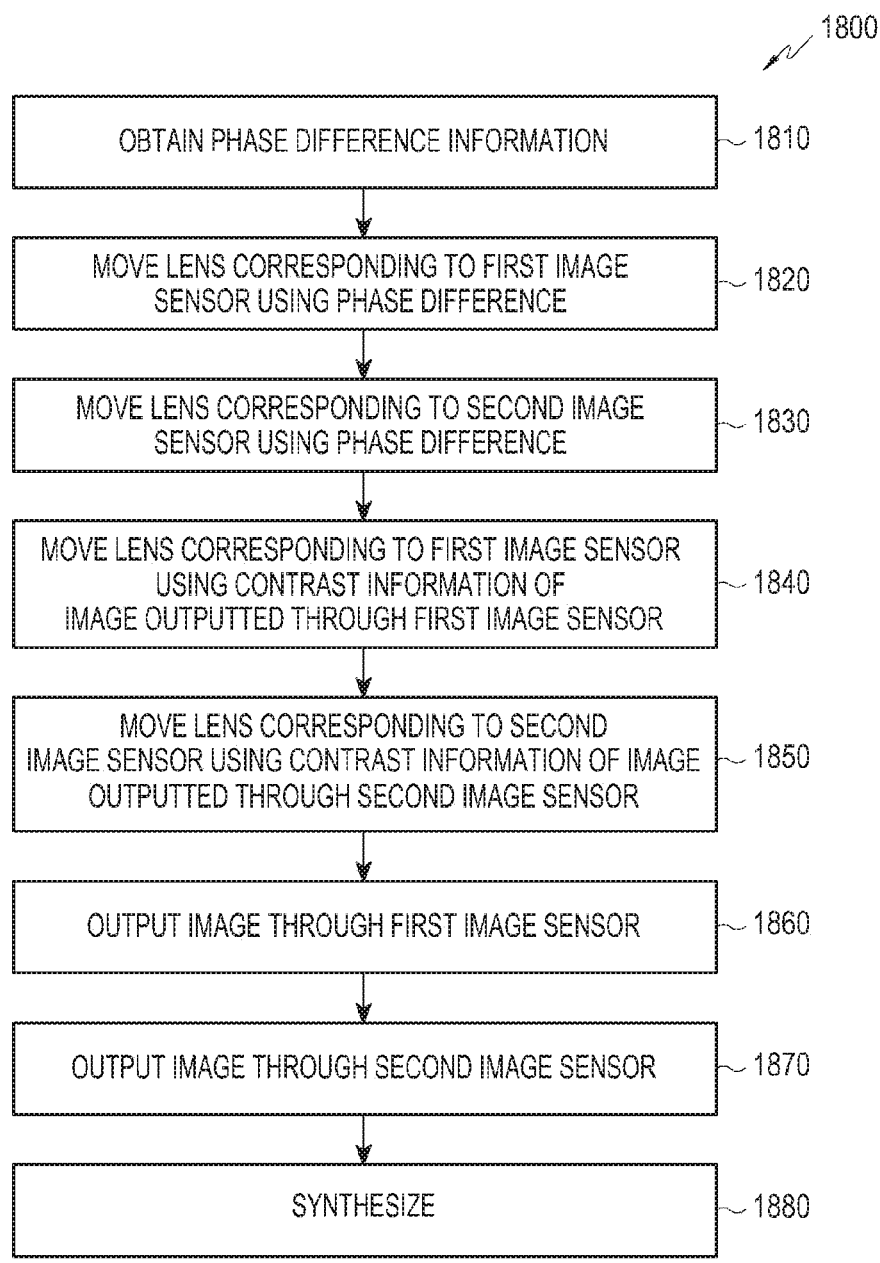
FIG. 18 is a flowchart illustrating a method for obtaining an image by an electronic device, according to an embodiment of the present disclosure.

FIG. 18 is a flowchart illustrating a method for obtaining an image by an electronic device, according to an embodiment of the present disclosure.

Referring to FIG. 18, in step 1810, Phase difference information is obtained through phase difference pixels arranged in at least one of a plurality of image sensors (e.g., the image sensors 621*a* and 621*b* of FIG. 6). Image signals detected from the photo diodes, respectively, may be transmitted to a processor (e.g., the image signal processor 21*a* of FIG. 2), and the image signal processor may obtain the phase difference information (e.g., information regarding a focusing state) based on the image signals detected from the phase difference pixels.

Focusing steps 1820, 1830, 1840, and 1850 may drive lenses (or lens assemblies) respectively corresponding to the first and/or second image sensor based on the obtained phase difference information in order to perform autofocusing (steps 1820 and 1830). After the autofocusing based on the phase difference information in step 1820 and 1830, the electronic device (e.g., the camera module 602 of FIG. 6), may drive the lenses (or lens assemblies) based on a contrast of images respectively detected through the first and second image sensor to perform additional autofocusing, in steps 1840 and 1850.

According to an embodiment of the present disclosure, the focusing steps 1820, 1830, 1840, and 1850 may selectively perform additional autofocusing based on the contrast. For example, the autofocusing operation of the camera module 602 of FIG. 6 may be performed based on phase difference information.

Images respectively detected through the first and second image sensor are output, in step 1860 and 1870. One of the first and second image sensor may output a mono-color image, and the other may output a color image. At least one of the first and second images may include at least two sensor groups (e.g., the short-exposure pixel 623*a* and long-exposure pixel 623*b*) having different exposure settings and may synthesize image information detected from the sensor groups, respectively, to output one image. For example, at least one of the first and second image sensors may provide an HDR function.

In step 1880, the images respectively outputted from the first and second image sensor are synthesized. One of the first and second image sensors may be a color image sensor, and the other may be a mono-color image sensor with a relatively higher sensitivity. For example, the electronic device and/or camera module (e.g., the camera module 602 of FIG. 6) may synthesize image information (e.g., color information) outputted from the color image sensor with an image outputted from the mono-color image sensor with a higher sensitivity to generate a new color image. According to an embodiment of the present disclosure, in an environment where a sufficient amount of light is secured, the electronic device may output an image obtained from at least one of the first and second image sensors to a display (e.g., the display 26 of FIG. 2) or store the image in a memory (e.g., the memory 23 of FIG. 2). In another embodiment, the electronic device may output the images respectively obtained from the first and second image sensors, and the third image obtained by synthesizing the images, to the display or save the images in the memory.

Figure 19:
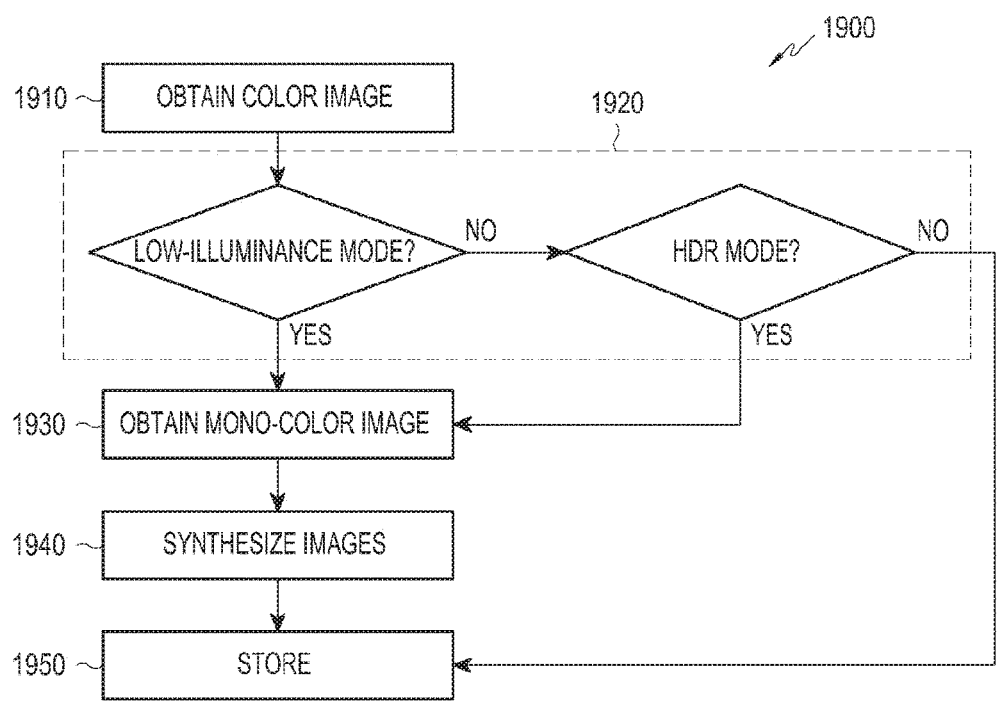
FIG. 19 is a flowchart illustrating a method for obtaining an image by an electronic device, according to an embodiment of the present disclosure.

FIG. 19 is a flowchart illustrating a method for obtaining an image by an electronic device, according to an embodiment of the present disclosure.

Referring to FIG. 19, according to an embodiment of the present disclosure, a method 1900 for obtaining an image by an electronic device (e.g., the electronic device 300 of FIG. 3) may store an image obtained from a color selection information (e.g., the second image sensor 621b of FIG. 6) in a memory (e.g., the memory 23 of FIG. 2) or output the image to a display (e.g., the display 26 of FIG. 2) functionally coupled thereto depending on an image capturing environment or image capturing mode of the electronic device.

According to an embodiment of the present disclosure, in step 1910, a color image is obtained using a processor (e.g., the application processor 21 or image signal processor 21a) by an electronic device. In step 1920, it is determined whether an image capturing environment is a low-illuminance mode or an image capturing mode is an HDR mode. In step 1930, a mono-color image is obtained according to the determined image capturing environment or image capturing mode. In step 1940, the mono-color image is synthesized with the color image. In step 1950, the synthesized image or the already obtained image is stored. The color image and the mono-color image may be obtained through the second image sensor (e.g., the second image sensor 621b of FIG. 6) and the first image sensor (e.g., the first image sensor 621a of FIG. 6), respectively. For example, the color image may be obtained simultaneously with the mono-color image, or the mono-color image may be obtained earlier than the color image. The method 1900 may obtain at least one information of gray level ratio information and/or brightness information on an object from the obtained mono-color image or color information on the object from the obtained color image using a processor (e.g., the application processor 21 or image signal processor 21a). For example, the first image sensor (e.g., the first image sensor 621a of FIG. 6) may detect and obtain at least one of gray level ratio information and/or brightness information on the object, and the second image sensor (e.g., the second image sensor 621b of FIG. 6) may detect and obtain color information on the object. The electronic device (e.g., the electronic device 300 of FIG. 3) may synthesize images respectively obtained from the image sensors (e.g., the first and second image sensor 621a and 621b of FIG. 6) to generate a new image (e.g., a synthesized image) using, at least, the gray level ratio information, brightness information, and/or color information obtained.

According to an embodiment of the present disclosure, in step 1920, the image capturing mode may be determined based on the obtained gray level ratio information, brightness information, and/or color information or based on live-view or pre-view image information, and an image may be obtained according to a result of the determination using a processor (e.g., the application processor 21 or the image signal processor 21a) in the electronic device.

The determination of the image capturing environment and/or image capturing mode may include the determining determination of whether it is in a low-illuminance mode and/or the image capturing mode of the electronic device is an HDR mode depending on the amount of light. Although FIG. 19 illustrates an example in which step 1920 is performed after step 1910, the method of obtaining the image according to an embodiment of the present disclosure is not limited thereto, and the image capturing environment may be determined before the color image is obtained. According to an embodiment of the present disclosure, whether it is in the low-illuminance mode according to the amount of light may be determined from a pre-view image of the image obtained from any one of the mono-color image sensor and color image sensor. For example, the processor (e.g., the image signal processor 21a of FIG. 2) may determine whether it is in the low-illuminance mode based on the mono-color image and/or color image obtained from one of a plurality of image sensors.

According to an embodiment of the present disclosure, the method 1900 may determine whether the image capturing mode is the low-illuminance mode from at least a portion of at least one of the gray level ratio information and brightness information through the first and/or second image sensor (e.g., the first and second image sensor 621a and 621b of FIG. 6). For example, the method 1900 may detect and obtain the mono-color image before determining the low-illuminance mode and/or HDR mode and may determine the low-illuminance mode and/or HDR mode based on gray level ratio information or brightness information on the obtained mono-color image.

Unless it is determined to be in the low-illuminance mode or HDR mode, the electronic device, e.g., the processor (e.g., the image signal processor 21a of FIG. 2), may store the obtained color image in the memory, in step 1950. According to an embodiment of the present disclosure, the processor may output the obtained color image through a display (e.g., the display 26 of FIG. 2) functionally coupled thereto.

When it is determined to be in the low-illuminance mode and/or HDR mode in step 1920, the electronic device may additionally obtain a mono-color image, in step 1930. A new color image may be outputted by obtaining the mono-color image from the mono-color image sensor relatively higher in sensitivity, and then synthesizing color information on the already obtained color image with the mono-color image.

The electronic device may output the image obtained by synthesizing the mono-color image and the color image through a display functionally coupled thereto, or may store the same in a memory.

According to an embodiment of the present disclosure, steps 1910 and 1930 of obtaining the color image and/or mono-color image may include obtaining a plurality of images having a different brightness for the same object or the same object area. When it is determined to be in the low-illuminance mode and/or HDR mode, the electronic device may simultaneously obtain images for the same object or the same object area through the first and second image sensor and may synthesize the images simultaneously obtained through the first and second image sensor, respectively, or correct the illuminance of the image obtained through the second image sensor (e.g., the second image sensor 621b of FIG. 6) and output and/or store the same.

According to an embodiment of the present disclosure, the method for obtaining an image may be performed by combining the method shown in FIG. 18 and the method shown in FIG. 19. For example, according to the phase difference information, gray level difference information, and brightness information detected in obtaining an image, focusing may be performed, and the low-illuminance mode may be determined, so that a color image (and/or mono-color image) with a clear gray level ratio representation may be obtained by synthesizing a plurality of images for one object.

According to an embodiment of the present disclosure, as the phase difference pixels are arranged in the first image sensor, information regarding a focusing state may be detected, and the second image sensor (and/or first image sensor) may be focused for the object based on at least a portion of the detected information regarding the focusing state. After focusing the first and/or second image sensor for the object, whether it may be determined whether it is in the low-illuminance mode and/or HDR mode.

According to an embodiment of the present disclosure, a single image for the object may be obtained depending on a result of the determination as to the image capturing environment (e.g., the low-illuminance mode) and/or image capturing mode (e.g., the HDR mode), and the same may be stored and/or outputted, or a plurality of images for the object may be obtained and synthesized, storing and/or outputting a synthesized image.

As set forth above, according to an embodiment of the present disclosure, an imaging device may comprise a first image sensor including a plurality of first micro lenses and a plurality of first light receiving sensors arranged corresponding to the first micro lenses, respectively, the first light receiving sensors each configured to detect light passing through a corresponding first micro lens and convert the light into an electrical signal and a second image sensor including a plurality of second micro lenses, a plurality of second light receiving sensors arranged corresponding to the second micro lenses, respectively, and color filters provided between corresponding light receiving sensors among the second light receiving sensors, the second light receiving sensors each configured to detect light passing through a corresponding second micro lens and convert the light into an electrical signal. At least some light receiving sensors of the first light receiving sensors or at least some light receiving sensors of the second light receiving sensors may be configured to be phase difference pixels detecting phase difference information for an object.

According to an embodiment of the present disclosure, the second light receiving sensors may be configured to receive light of a narrower wavelength band than a wavelength band of light received by the first light receiving sensors using the color filters.

According to an embodiment of the present disclosure, the first light receiving sensors may include a first sensor group and a second sensor group, and an exposure time of the first sensor group may be set to be different from an exposure time of the second sensor group.

According to an embodiment of the present disclosure, the phase difference pixels may be configured to be arranged in a sensor group set to have a longer exposure time of the first sensor group and the second sensor group.

According to an embodiment of the present disclosure, the second light receiving sensors may include a third sensor group and a fourth sensor group, and an exposure time of the third sensor group may be set to be different from an exposure time of the fourth sensor group.

According to an embodiment of the present disclosure, the phase difference pixels may be configured to be arranged in a sensor group set to have a longer exposure time of the third sensor group and the fourth sensor group.

According to an embodiment of the present disclosure, at least some of the first light receiving sensors may be designated to operate as the phase difference pixels, and the second light receiving sensors may not be designated to operate as the phase difference pixels.

According to an embodiment of the present disclosure, information regarding a focusing state for the first image sensor or the second image sensor may be obtained based on the phase difference information obtained from the phase difference pixels.

According to an embodiment of the present disclosure, the first image sensor may further include a plurality of filters positioned between a corresponding micro lens of the first micro lenses and a corresponding light receiving sensor of the first light receiving sensors, and the filters may have a higher light transmittance than the color filters.

According to an embodiment of the present disclosure, an electronic device may comprise a first image sensor, a second image sensor, and a processor, wherein the processor may be configured to obtain a first image for an object through the first image sensor, determine information regarding a focusing state for the object based on at least a portion of the first image, focus the second image sensor for the object based on at least a portion of the information regarding the focusing state, and obtain a color image for the object through the focused second image sensor.

According to an embodiment of the present disclosure, the first image sensor may include a plurality of first micro lenses and a plurality of first light receiving sensors arranged corresponding to the first micro lenses, respectively, and detecting light passing through the first micro lenses and converting the light into an electrical signal.

According to an embodiment of the present disclosure, the first image sensor may receive light of a broader wavelength band of light than a wavelength band of light received from the second image sensor.

According to an embodiment of the present disclosure, the second image sensor may include a plurality of second micro lenses, a plurality of second light receiving sensors arranged corresponding to the second micro lenses, respectively, and each configured to detect light passing through a corresponding second micro lens and convert the light into an electrical signal, and a plurality of color filters, wherein each of the plurality of color filters may be positioned between a corresponding micro lens of the second micro lenses and a corresponding light receiving sensor of the second light receiving sensors.

According to an embodiment of the present disclosure, the first image sensor may include a plurality of first micro lenses, a plurality of first light receiving sensors arranged corresponding to the first micro lenses, respectively, and each detecting light passing through the first micro lenses and converting the light into an electrical signal, and a plurality of filters, wherein each of the plurality of filters may be positioned between a corresponding micro lens of the first micro lenses and a corresponding light receiving sensor of the first light receiving sensors and has a higher light transmittance than the color filters.

According to an embodiment of the present disclosure, at least some of pixels constituting the first image sensor or at least some of pixels constituting the second image sensor may include phase difference pixels detecting phase difference information for the object, and the processor may be configured to detect the information regarding the focusing state from the phase difference pixels.

According to an embodiment of the present disclosure, the pixels constituting the first image sensor may include a first sensor group and a second sensor group, and an exposure time of the first sensor group may be set to be different from an exposure time of the second sensor group, and the phase difference pixels may be configured to be arranged in a sensor group set to have a longer exposure time of the first sensor group and the second sensor group.

According to an embodiment of the present disclosure, a method for obtaining an image by an electronic device including a first image sensor outputting a mono-color image and a second image sensor outputting a color image including color information on, at least, red, green, and blue may comprise obtaining a first image for an object from the first image sensor or the second image sensor, determining information regarding a focusing state for the object based on at least a portion of the first image, focusing the second image sensor for the object based on at least a portion of the information regarding the focusing state, and obtaining a second image for the object through the focused second image sensor.

According to an embodiment of the present disclosure, the method may further comprise determining gray level ratio information or brightness information for the object based on at least a portion of the first image.

According to an embodiment of the present disclosure, the method may further comprise obtaining the gray level ratio information or the brightness information from the first image sensor, obtaining the color information for the object from the second image sensor, and generating a synthesized image from the first image and the second image using the gray level ratio information, the brightness information, or the color information.

According to an embodiment of the present disclosure, the method may comprise determining whether an image capturing mode of the electronic device is a low-illuminance mode based on, at least, the gray level ratio information or the brightness information and generating an illuminance-corrected image from the second image using at least a portion of the gray level ratio information or the brightness information based on the image capturing mode being determined to be the low-illuminance mode.

While the present disclosure has been shown and described with reference to certain embodiments thereof, it will be apparent to those of ordinary skill in the art that various changes in form and detail may be made thereto without departing from the spirit and scope of the present disclosure as defined by the following claims.

What is claimed is:

1. An imaging device, comprising:
   a first image sensor comprising a plurality of first micro lenses and a plurality of first light receiving sensors, each of the plurality of first light receiving sensors being configured to detect light passing through a corresponding one of the plurality of first micro lenses and convert the light into an electrical signal; and
   a second image sensor comprising a plurality of second micro lenses, a plurality of second light receiving sensors, and color filters provided between one or more micro lenses of the plurality of second micro lenses and one or more light receiving sensors of the plurality of second light receiving sensors, each of the plurality of second light receiving sensors being configured to detect light passing through a corresponding one of the plurality of second micro lenses and convert the light into an electrical signal,
   wherein at least some of the plurality of the first light receiving sensors or at least some of the plurality of second light receiving sensors are set to be phase difference pixels that detect phase difference information for an object,
   wherein the plurality of first light receiving sensors comprises a first sensor group and a second sensor group, and wherein a first exposure time of the first sensor group is set to be different from a second exposure time of the second sensor group, and
   wherein the phase difference pixels are configured to be arranged in a sensor group set to have a longer exposure time from among the first sensor group and the second sensor group.

2. The imaging device of claim 1, wherein the plurality of second light receiving sensors are configured to receive light of a narrower wavelength band than a wavelength band of light received by the plurality of first light receiving sensors.

3. The imaging device of claim 1, wherein the plurality of second light receiving sensors comprises a third sensor group and a fourth sensor group, and wherein a third exposure time of the third sensor group is set to be different from a fourth exposure time of the fourth sensor group.

4. The imaging device of claim 3, wherein the phase difference pixels are configured to be arranged in a sensor group set to have a longer exposure time from among the third sensor group and the fourth sensor group.

5. The imaging device of claim 3, wherein at least some of the plurality of first light receiving sensors are designated to operate as the phase difference pixels, and the plurality of second light receiving sensors are not designated to operate as the phase difference pixels.

6. The imaging device of claim 1, wherein information regarding a focusing state for the first image sensor or the second image sensor is obtained based on the phase difference information obtained from the phase difference pixels.

7. The imaging device of claim 1, wherein the first image sensor further comprises a plurality of filters positioned between a micro lens of the plurality of first micro lenses and a corresponding light receiving sensor of the plurality of first light receiving sensors, and wherein the plurality of filters have a higher light transmittance than the color filters.

8. An electronic device, comprising:
   a first image sensor;
   a second image sensor; and
   a processor,
   wherein the processor is configured to obtain a first image for an object through the first image sensor,
   determine information regarding a focusing state with respect to the object based on the first image,
   focus the second image sensor on the object based on the information regarding the focusing state,
   obtain a color image for the object through the second image sensor, and
   synthesize the first image obtained through the first image sensor with the color image obtained with the second image sensor after the second image sensor has been focused based on the information regarding the focusing state.

9. The electronic device of claim 8, wherein the first image sensor comprises:
a plurality of first micro lenses; and
a plurality of first light receiving sensors, each of the plurality of first light receiving sensors arranged to correspond to a respective one of the plurality of first micro lenses, wherein the plurality of first light receiving sensors detects light passing through the plurality of first micro lenses and converts the light into an electrical signal.

10. The electronic device of claim 8, wherein the first image sensor receives light of a broader wavelength band of light than a wavelength band of light received from the second image sensor.

11. The electronic device of claim 8, wherein the second image sensor comprises:
a plurality of second micro lenses;
a plurality of second light receiving sensors, each of the plurality of second light receiving sensors arranged to correspond to a respective one of the plurality of second micro lenses, wherein the plurality of second light receiving sensors detects light passing through the plurality of second micro lenses and converts the light into an electrical signal; and
a plurality of color filters,
wherein each of the plurality of color filters is positioned between one or more micro lenses of the plurality of second micro lenses and one or more light receiving sensors of the plurality of second light receiving sensors.

12. The electronic device of claim 11, wherein the first image sensor comprises:
a plurality of first micro lenses;
a plurality of first light receiving sensors, each of the plurality of first light receiving sensors being arranged to correspond to a respective one of the plurality of first micro lenses, wherein the plurality of first light receiving sensors detects light passing through the plurality of first micro lenses and converts the light into an electrical signal; and
a plurality of filters,
wherein each of the plurality of filters is positioned between a corresponding micro lens of the plurality of first micro lenses and a corresponding light receiving sensor of the plurality of first light receiving sensors, and has a higher light transmittance than the plurality of color filters.

13. The electronic device of claim 8, wherein at least some of a plurality of pixels constituting the first image sensor or at least some of a plurality of pixels constituting the second image sensor include phase difference pixels that detect phase difference information for the object, and wherein the processor is further configured to detect the information regarding the focusing state from the phase difference pixels.

14. The electronic device of claim 13, wherein the plurality of pixels constituting the first image sensor include a first sensor group and a second sensor group, wherein a first exposure time of the first sensor group is set to be different from a second exposure time of the second sensor group, and wherein the phase difference pixels are configured to be arranged in a sensor group set to have a longer exposure time from among the first sensor group and the second sensor group.

15. A method for obtaining an image by an electronic device, the method comprising:
obtaining a first image for an object from a first image sensor of the electronic device;
determining information regarding a focusing state with respect to the object based on the first image;
focusing a second image sensor of the electronic device on the object based on the information regarding the focusing state;
obtaining a second image for the object through the second image sensor; and
generating a synthesized image from the first image obtained through the first image sensor with the second image obtained with the second image sensor after the second image sensor has been focused based on the information regarding the focusing state.

16. The method of claim 15, further comprising determining the gray level ratio information or the brightness information for the object based on the first image.

17. The method of claim 16, further comprising:
obtaining the gray level ratio information or the brightness information from the first image sensor;
obtaining the color information for the object from the second image sensor; and
wherein the synthesized image is generated from the first image and the second image using at least one of the gray level ratio information, the brightness information, and the color information.

18. The method of claim 16, further comprising:
determining whether an image capturing mode of the electronic device is a low-illuminance mode based on at least one of the gray level ratio information and the brightness information; and
generating an illuminance-corrected image from the second image using the gray level ratio information or the brightness information, when the image capturing mode is the low-illuminance mode.

* * * * *